(12) United States Patent
Hsu et al.

(10) Patent No.: US 9,316,809 B2
(45) Date of Patent: Apr. 19, 2016

(54) IMAGE CAPTURING LENS SYSTEM, IMAGING DEVICE AND MOBILE TERMINAL

(71) Applicant: LARGAN PRECISION CO., LTD., Taichung (TW)

(72) Inventors: Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 155 days.

(21) Appl. No.: 14/133,170

(22) Filed: Dec. 18, 2013

(65) Prior Publication Data

US 2015/0130992 A1    May 14, 2015

(30) Foreign Application Priority Data

Nov. 13, 2013    (TW) .............................. 102141202 A

(51) Int. Cl.
*G02B 9/34*    (2006.01)
*G02B 13/00*    (2006.01)

(52) U.S. Cl.
CPC .................................... *G02B 13/004* (2013.01)

(58) Field of Classification Search
CPC .......... G02B 13/004; G02B 9/00; G02B 8/34; G02B 9/36; G02B 9/56
USPC .......................... 359/708, 715, 771, 775, 779
See application file for complete search history.

(56) References Cited

U.S. PATENT DOCUMENTS

| 6,813,099 | B2 | 11/2004 | Yamaguchi |
| 7,911,715 | B2 | 3/2011 | Shinohara |
| 8,014,080 | B1 | 9/2011 | Chen et al. |
| 2010/0165485 | A1 | 7/2010 | Do |
| 2014/0043697 | A1* | 2/2014 | Liao et al. ..................... 359/715 |

FOREIGN PATENT DOCUMENTS

TW    201405164    2/2014

* cited by examiner

*Primary Examiner* — Bumsuk Won
*Assistant Examiner* — Grant Gagnon
(74) *Attorney, Agent, or Firm* — Locke Lord LLP; Tim Tingkang Xia, Esq.

(57) ABSTRACT

An image capturing lens system includes, in order from an object side to an image side, a first lens element, a second lens element, a third lens element and a fourth lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with negative refractive power has an object-side surface being concave in a paraxial region thereof. The fourth lens element with refractive power has an image-side surface being concave in a paraxial region thereof, wherein an object-side surface and the image-side surface of the fourth lens element are aspheric. The image capturing lens system has a total of four lens elements with refractive power.

25 Claims, 22 Drawing Sheets

IMAGE CAPTURING LENS SYSTEM, IMAGING DEVICE AND MOBILE TERMINAL

RELATED APPLICATIONS

This application claims priority to Taiwan Application Serial Number 102141202, filed Nov. 13, 2013, which is incorporated by reference herein in its entirety.

BACKGROUND

1. Technical Field

The present disclosure relates to an image capturing lens system. More particularly, the present disclosure relates to a compact image capturing lens system applicable to a mobile terminal.

2. Description of Related Art

In recent years, with the popularity of mobile terminals having camera functionalities, the demand of miniaturized optical systems has been increasing. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system in a portable electronic product typically utilizes a three-element lens structure. Due to the popularity of mobile products with high-end specifications, such as smart phones, tablet personal computers, wearable apparatus and other high-end mobile terminals, the requirements for high resolution and image quality of present compact optical systems increase significantly. However, the conventional optical systems cannot satisfy these requirements of the compact optical systems.

Another conventional compact optical system provides a four-element lens structure. However, it is not favorable for the resolving power and illumination in a peripheral region of an image. Furthermore, it is also not favorable for reducing photosensitivity, and the manufacturing cost will be thereby increased.

In light of the foregoing, a need exists in the art for having an optical system with superior resolving power and illumination as well as sensitivity reduction of an optical system to manufacturing tolerances while having a compact size thereof.

SUMMARY

According to one aspect of the present disclosure, an image capturing lens system includes, in order from an object side to an image side, a first lens element, a second lens element, a third lens element and a fourth lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with negative refractive power has an object-side surface being concave in a paraxial region thereof. The fourth lens element with refractive power has an image-side surface being concave in a paraxial region thereof, wherein both of an object-side surface and the image-side surface of the fourth lens element are aspheric, and the image-side surface of the fourth lens element has at least one convex shape in an off-axis region thereof. The image capturing lens system has a total of four lens elements with refractive power, wherein any two lens elements of the image capturing lens system adjacent to each other have a space in a paraxial region between the two lens elements. When a focal length of the second lens element is f2, a focal length of the third lens element is f3, an axial distance between the second lens element and the third lens element is T23, and an axial distance between the first lens element and the second lens element is T12, the following conditions are satisfied:

$$|f3/f2|<0.60;\text{ and}$$

$$1.0<T23/T12<3.6.$$

According to another aspect of the present disclosure, an imaging device includes the image capturing lens system according to the aforementioned aspect and an image sensor, wherein the image sensor is connected to an image plane of the image capturing lens system.

According to still another aspect of the present disclosure, a mobile terminal includes the imaging device according to the aforementioned aspect.

According to yet another aspect of the present disclosure, an image capturing lens system includes, in order from an object side to an image side, a first lens element, a second lens element, a third lens element and a fourth lens element. The first lens element with positive refractive power has an object-side surface being convex in a paraxial region thereof. The second lens element with refractive power has an object-side surface being concave in a paraxial region thereof and an image-side surface being convex in a paraxial region thereof. The third lens element with negative refractive power has an object-side surface being concave in a paraxial region thereof. The fourth lens element with refractive power has an image-side surface being concave in a paraxial region thereof, wherein both of an object-side surface and the image-side surface of the fourth lens element are aspheric, and the image-side surface of the fourth lens element has at least one convex shape in an off-axis region thereof. The image capturing lens system has a total of four lens elements with refractive power, wherein any two lens elements of the image capturing lens system adjacent to each other have a space in a paraxial region between the two lens elements. When a focal length of the second lens element is f2, a focal length of the third lens element is f3, an axial distance between the second lens element and the third lens element is T23, an axial distance between the first lens element and the second lens element is T12, a central thickness of the first lens element is CT1, a central thickness of the second lens element is CT2, and a central thickness of the third lens element is CT3, the following conditions are satisfied:

$$|f3/f2|<1.25;$$

$$0.6<T23/T12<3.6;\text{ and}$$

$$0.60<CT1/(CT2+CT3).$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
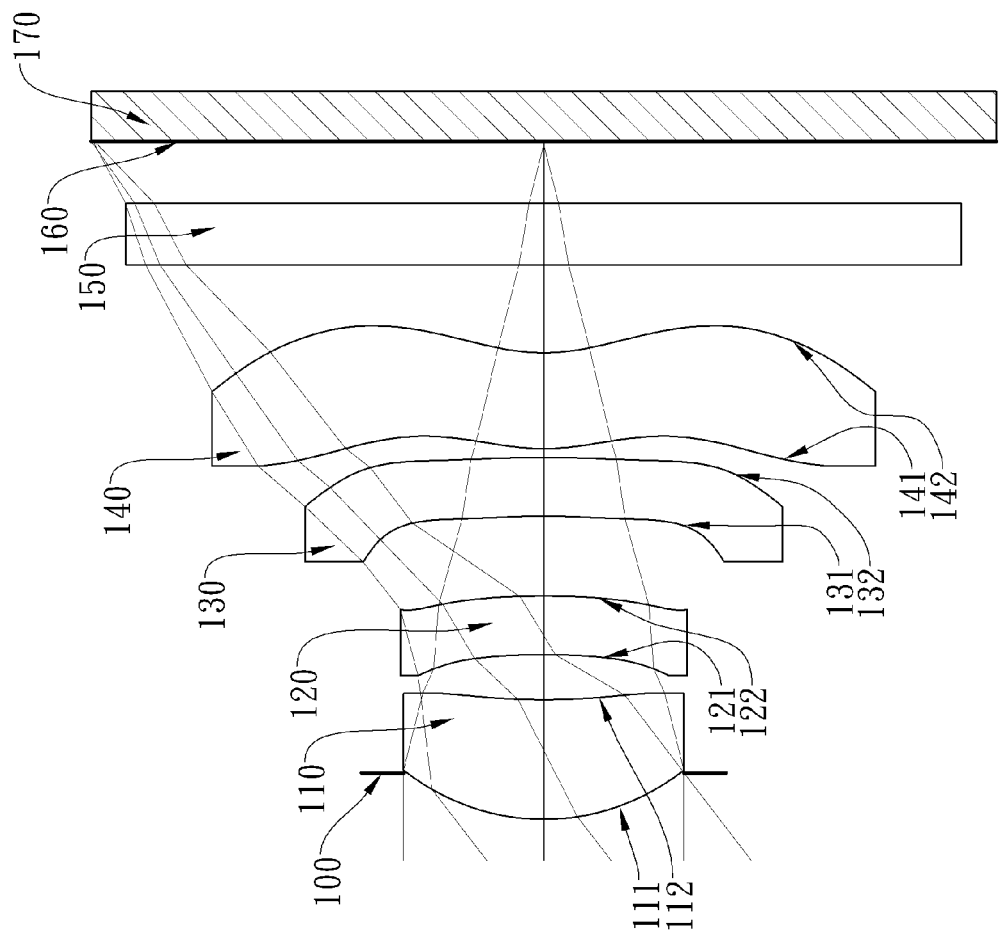
FIG. 1A is a schematic view of an imaging device according to the 1st embodiment of the present disclosure.

An image capturing lens system includes, in order from an object side to an image side, a first lens element, a second lens element, a third lens element and a fourth lens element. The image capturing lens system has a total of four lens elements with refractive power.

Each of the first through fourth lens elements is a single and non-cemented lens element. That is, any two lens elements adjacent to each other are not cemented, and there is a space in a paraxial region between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the image capturing lens system. Therefore, the image capturing lens system of the present disclosure provides four non-cemented lens elements for improving the problem generated by the cemented lens elements as it is favorable for manufacturing and assembling the lens elements.

The first lens element has positive refractive power, so that it provides the image capturing lens system with the positive refractive power as it needs to be so as to reduce the total track length of the image capturing lens system. The first lens element has an object-side surface being convex in a paraxial region thereof, so that it is favorable for further reducing the total track length.

The second lens element has an object-side surface being concave in a paraxial region thereof and an image-side surface being convex in a paraxial region thereof, so that it is favorable for correcting the astigmatism of the image capturing lens system. The image-side surface of the second lens element can have at least one concave shape in an off-axis region thereof, so that it is favorable for reducing the incident angle of the light projecting onto the image sensor so as to increase the receiving efficiency of the image sensor.

The third lens element has negative refractive power, so that it is favorable for correcting the aberration of the image capturing lens system. The third lens element has an object-side surface being concave in a paraxial region thereof, so that it is favorable for correcting the astigmatism of the image capturing lens system. The image-side surface of the third lens element can have at least one convex shape in an off-axis region thereof, so that it is favorable for reducing the incident angle of the light projecting onto an image sensor so as to increase the receiving efficiency of the image sensor.

The fourth lens element has positive refractive power, so that that the principal point can be positioned towards the image plane so as to effectively control the incident angle of the light projecting onto the image plane. Therefore, it is favorable for improving the relative illumination in a peripheral region of an image so as to avoid vignetting. The fourth lens element can have an object-side surface being convex in a paraxial region thereof and has an image-side surface being concave in a paraxial region thereof. Furthermore, the image-side surface of the fourth lens element has at least one convex shape in an off-axis region thereof. Therefore, it is favorable for correcting the astigmatism and aberration of the off-axis.

When a focal length of the second lens element is f2, and a focal length of the third lens element is f3, the following condition is satisfied: $|f3/f2|<1.25$. Therefore, it is favorable for improving the resolving power and illumination in a peripheral region of the image capturing lens system. Preferably, the following condition is satisfied: $|f3/f2|<0.90$. More preferably, the following condition is satisfied: $|f3/f2|<0.60$. Even more preferably, the following condition is satisfied: $|f3/f2|<0.45$.

When an axial distance between the first lens element and the second lens element is T12, and an axial distance between the second lens element and the third lens element is T23, the following condition is satisfied: $0.6<T23/T12<3.6$. Therefore, it is favorable for keeping the image capturing lens system compact. Preferably, the following condition is satisfied: $1.0<T23/T12<3.6$. Preferably, the following condition is satisfied: $1.0<T23/T12<2.8$.

When an Abbe number of the second lens element is V2, and the following condition is satisfied: $V2<30$. Therefore, it is favorable for correcting the chromatic aberration of the image capturing lens system.

When a focal length of the first lens element is f1, and the focal length of the second lens element is f2, the following condition is satisfied: $|f1/f2|<0.50$. Therefore, it is favorable for using the second lens element to adjust the light gathering ability of the first lens element so as to maintain good chromatic aberration and spherical aberration abilities.

When the Abbe number of the second lens element is V2, an Abbe number of the third lens element is V3, and an Abbe number of the first lens element is V1, the following condition is satisfied: $0.60<(V2+V3)/V1<1.20$. Therefore, it is favorable for correcting the chromatic aberration of the image capturing lens system.

When a focal length of the image capturing lens system is f, and a curvature radius of the image-side surface of the third lens element is R6, the following condition is satisfied: $|f/R6|<1.0$. Therefore, it is favorable for reducing Petzval Sum and aberration of the image capturing lens system so as to improve the resolving power of the image capturing lens system.

When a vertical distance between a maximum effective diameter position on the image-side surface of the third lens element and an optical axis is Y32, and a central thickness of the third lens element is CT3, the following condition is satisfied: $3.0<Y32/CT3<6.0$. Therefore, the thickness of the third lens element will be favorable for reducing the photosensitivity of the image capturing lens system.

When a central thickness of the first lens element is CT1, a central thickness of the second lens element is CT2, and the central thickness of the third lens element is CT3, the following condition is satisfied: $0.60<CT1/(CT2+CT3)$. Therefore, the thicknesses of every lens elements will be more proper; therefore, it is favorable for assembling the image capturing lens system so as to maintain a compact size thereof. Preferably, the following condition is satisfied: $0.75<CT1/(CT2+CT3)<1.5$.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing lens system can also be reduced.

According to the image capturing lens system of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, an aperture stop can be configured as a front stop or a middle stop. A front stop disposed between an imaged object and the first lens element can provide a longer distance between an exit pupil of the image capturing lens system and the image plane and thereby improves the image-sensing efficiency of an image sensor. A middle stop disposed between the first lens element and the image plane is favorable for enlarging the field of view of the image capturing lens system and thereby provides a wider field of view for the same.

The present image capturing lens system can be optionally applied to moving focus optical systems. According to the image capturing lens system of the present disclosure, the image capturing lens system is featured with good correction ability and high image quality, and can be applied to 3D (three-dimensional) image capturing applications, in products such as digital cameras, mobile devices, digital tablets, wearable devices and other mobile terminals.

According to the present disclosure, an imaging device is provided. The imaging device includes the image capturing lens system according to the aforementioned image capturing lens system of the present disclosure, and an image sensor, wherein the image sensor is disposed on an image plane of the aforementioned image capturing lens system. As a result, it is favorable for reducing the total track length of the image capturing lens system while obtaining large field of view. Furthermore, it is also favorable for improving the resolving power and illumination so as to achieve the best image quality. Preferably, the imaging device can further include a barrel member, a holding member or a combination thereof.

According to the present disclosure, a mobile terminal is provided, wherein the mobile terminal includes the aforementioned imaging device. The imaging device includes the image capturing lens system according to the aforementioned image capturing lens system of the present disclosure, and the image sensor, wherein the image sensor is disposed on an image plane of the aforementioned image capturing lens system. As a result, it is favorable for reducing the total track length of the image capturing lens system while obtaining large field of view. Furthermore, it is also favorable for improving the resolving power and illumination so as to achieve the best image quality.

Figure 10:
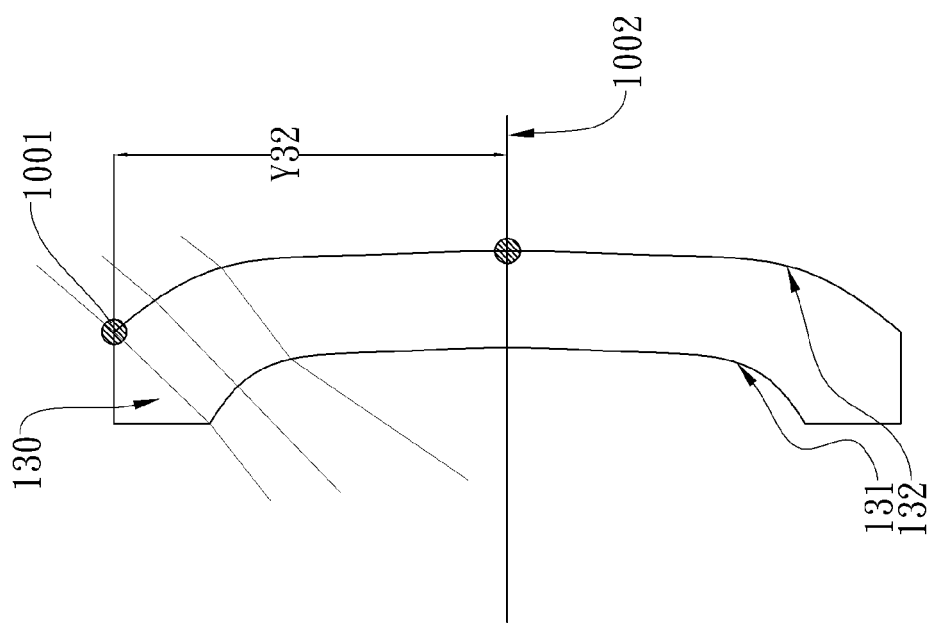
FIG. 10 shows Y32 of the third lens element according to the 1st embodiment.

In FIG. 10, Y32 shows the third lens element of the 1st embodiment and Y32 is a vertical distance between a maximum effective diameter position 1001 on the image-side surface 132 of the third lens element 130 and an optical axis 1002.

Figure 11A:
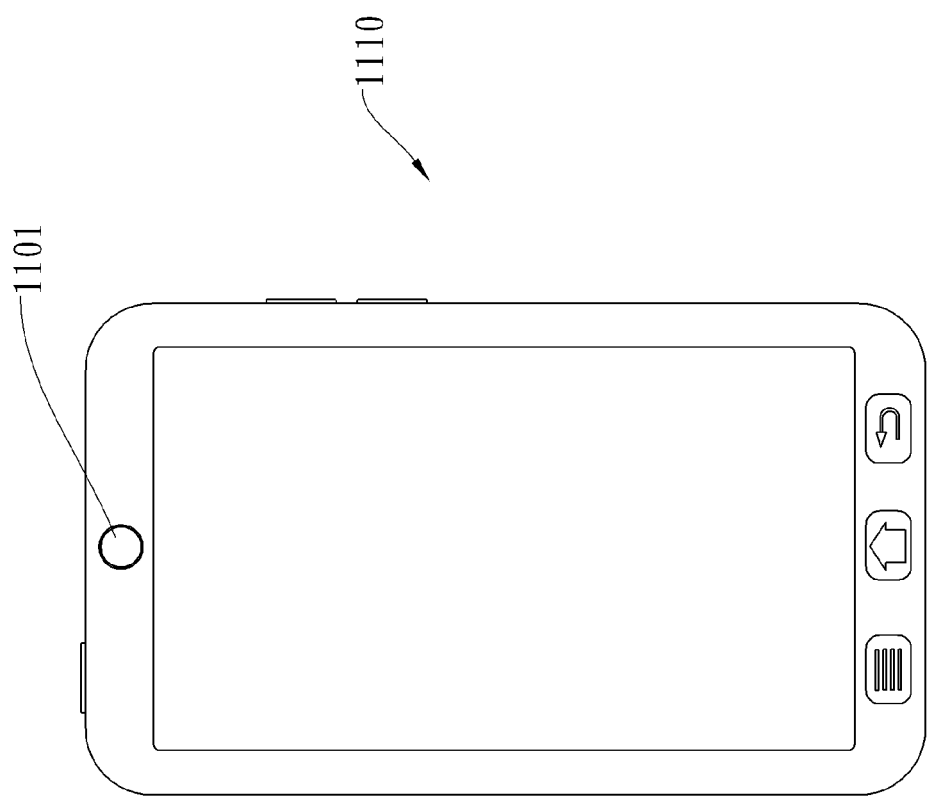
FIG. 11A shows a smart phone with an imaging device of the present disclosure installed therein.
Figure 11B:
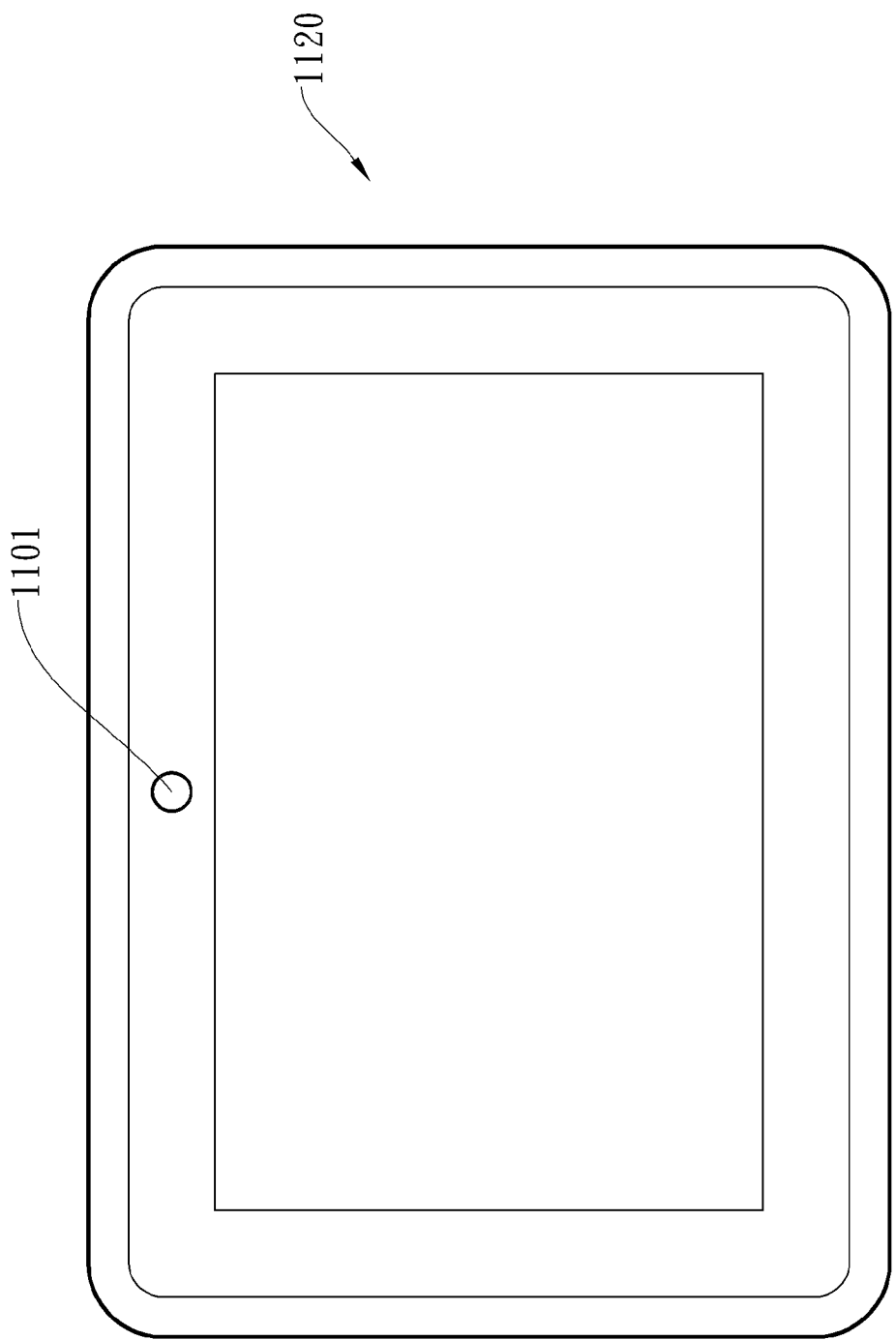
FIG. 11B shows a tablet personal computer with an imaging device of the present disclosure installed therein.
Figure 11C:
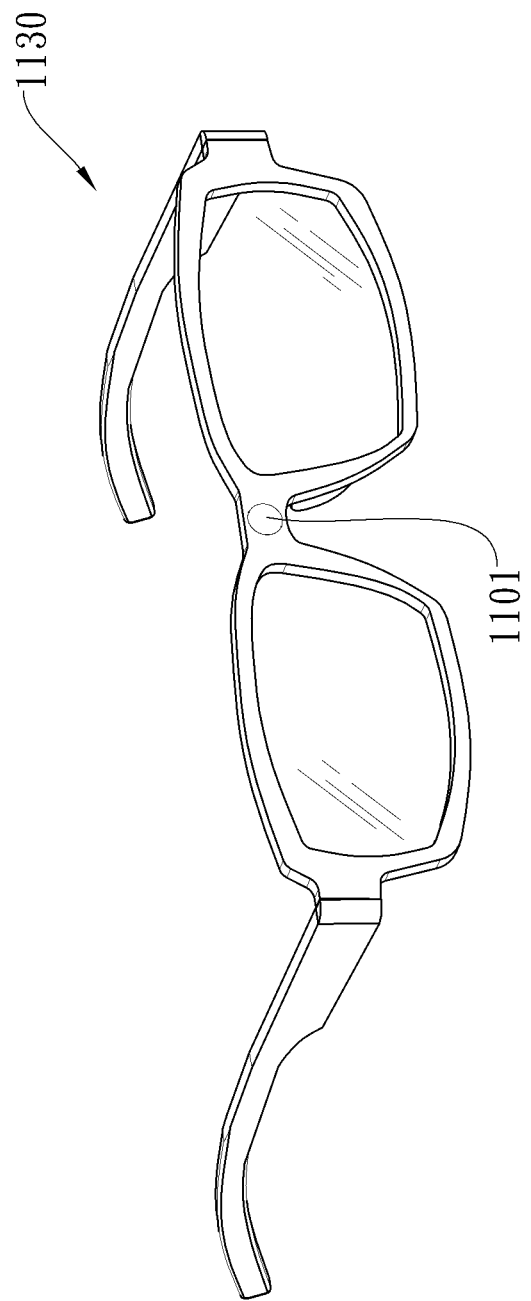
FIG. 11C shows a wearable device with an imaging device of the present disclosure installed therein.

In FIG. 11A, FIG. 11B and FIG. 11C, an imaging device 1101 may be installed in but not limited to a mobile terminal, including a smart phone 1110, a tablet personal computer 1120 or a wearable device 1130. The three exemplary figures of different kinds of mobile terminal are only exemplary for showing the imaging device of present disclosure installing in a mobile terminal and is not limited thereto. Preferably, the mobile terminal can further include but not limited to display, control unit, random access memory unit (RAM) a read only memory unit (ROM) or a combination thereof.

According to the above description of the present disclosure, the following 1st-9th specific embodiments are provided for further explanation.

1st Embodiment

Figure 1B:
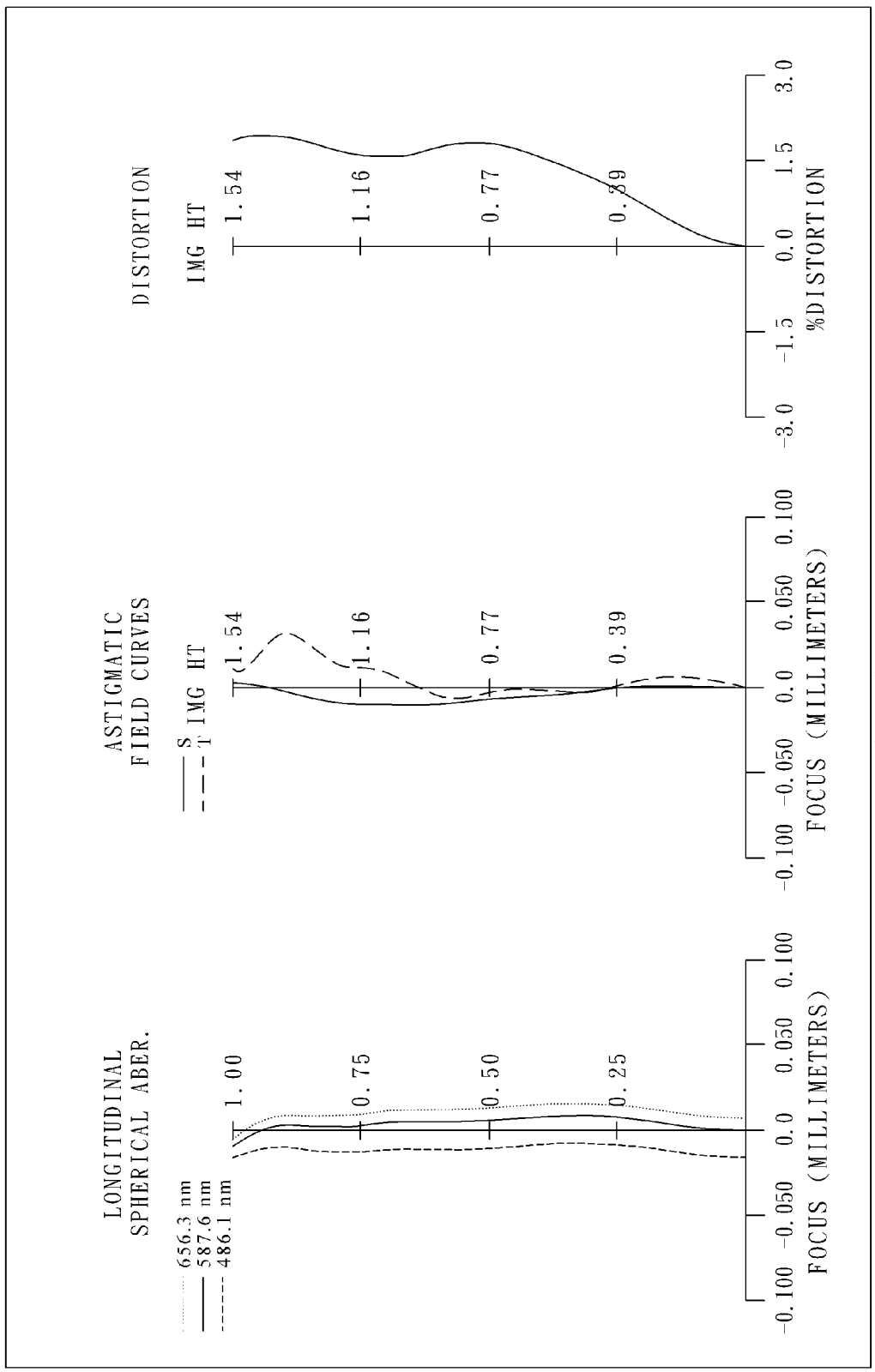
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging device according to the 1st embodiment.

In FIG. 1A, the imaging device includes the image capturing lens system (not otherwise herein labeled) of the present disclosure and an image sensor 170. The image capturing lens system includes, in order from an object side to an image side, an aperture stop 100, a first lens element 110, a second lens element 120, a third lens element 130, a fourth lens element 140, an IR-cut filter 150 and an image plane 160, wherein the image capturing lens system has a total of four lens elements (110-140) with refractive power.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being concave in a paraxial region thereof and an image-side surface 122 being convex in a paraxial region thereof, which are both aspheric, and the second lens element 120 is made of plastic material. Furthermore, the image-side surface 122 of the second lens element 120 has at least one concave shape in an off-axis region thereof.

The third lens element 130 with negative refractive power has an object-side surface 131 being concave in a paraxial region thereof and an image-side surface 132 being convex in a paraxial region thereof, which are both aspheric, and the third lens element 130 is made of plastic material.

The fourth lens element 140 with positive refractive power has an object-side surface 141 being convex in a paraxial region thereof and an image-side surface 142 being concave in a paraxial region thereof, which are both aspheric, and the fourth lens element 140 is made of plastic material. Furthermore, the image-side surface 142 of the fourth lens element 140 has at least one convex shape in an off-axis region thereof.

The IR-cut filter 150 is made of glass and located between the fourth lens element 140 and the image plane 160, and will not affect the focal length of the image capturing lens system. The image sensor 170 is disposed on the image plane 160 of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens system of the imaging device according to the 1st embodiment, when a focal length of the image capturing lens system is f, an f-number of the image capturing lens system is Fno, and half of a maximal field of view of the image capturing lens system is HFOV, these parameters have the following values: f=1.97 mm; Fno=2.06; and HFOV=37.5 degrees.

In the image capturing lens system according to the 1st embodiment, when an Abbe number of the second lens element 120 is V2, and the following condition is satisfied: V2=23.3.

In the image capturing lens system according to the 1st embodiment, when the Abbe number of the second lens element 120 is V2, an Abbe number of the third lens element 130 is V3, and an Abbe number of the first lens element 110 is V1, the following condition is satisfied: (V2+V3)/V1=0.83.

In the image capturing lens system of the imaging device according to the 1st embodiment, when an axial distance between the first lens element 110 and the second lens element 120 is T12, and an axial distance between the second lens element 120 and the third lens element 130 is T23, the following condition is satisfied: T23/T12=1.77.

In the image capturing lens system according to the 1st embodiment, when a central thickness of the first lens element 110 is CT1, a central thickness of the second lens element 120 is CT2, and a central thickness of the third lens element 130 is CT3, the following condition is satisfied: CT1/(CT2+CT3)=1.02.

In the image capturing lens system of the imaging device according to the 1st embodiment, when the focal length of the image capturing lens system is f, and a curvature radius of the image-side surface 132 of the third lens element 130 is R6, the following condition is satisfied: |f/R6|=0.51.

In the image capturing lens system of the imaging device according to the 1st embodiment, when a focal length of the first lens element 110 is f1, and a focal length of the second lens element 120 is f2, the following condition is satisfied: |f1/f2|=0.00.

In the image capturing lens system of the imaging device according to the 1st embodiment, when a focal length of the third lens element 130 is f3, and the focal length of the second lens element 120 is f2, the following condition is satisfied: |f3/f2|=0.01.

In the image capturing lens system according to the 1st embodiment, when a vertical distance between a maximum effective diameter position on the image-side surface 132 of the third lens element 130 and an optical axis is Y32, and a central thickness of the third lens element 130 is CT3, the following condition is satisfied: Y32/CT3=4.07.

The detailed optical data of the 1st embodiment are shown in Table 1 and the aspheric surface data are shown in Table 2 below.

TABLE 1

1st Embodiment
f = 1.97 mm, Fno = 2.06, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 0.750 | ASP | 0.408 | Plastic | 1.544 | 55.9 | 1.91 |
| 3 | | 2.169 | ASP | 0.154 | | | | |
| 4 | Lens 2 | −2.612 | ASP | 0.200 | Plastic | 1.640 | 23.3 | −587.87 |

TABLE 1-continued

1st Embodiment
f = 1.97 mm, Fno = 2.06, HFOV = 37.5 deg.

| Surface # | | Curvature Radius | | Thickness | Material | Index | Abbe # | Focal Length |
|---|---|---|---|---|---|---|---|---|
| 5 | | −2.708 | ASP | 0.273 | | | | |
| 6 | Lens 3 | −1.934 | ASP | 0.200 | Plastic | 1.640 | 23.3 | −6.24 |
| 7 | | −3.901 | ASP | 0.030 | | | | |
| 8 | Lens 4 | 0.714 | ASP | 0.327 | Plastic | 1.544 | 55.9 | 18.91 |
| 9 | | 0.644 | ASP | 0.300 | | | | |
| 10 | IR-cut filter | Plano | | 0.210 | Glass | 1.517 | 64.2 | — |
| 11 | | Plano | | 0.212 | | | | |
| 12 | Image | Plano | | — | | | | |

Note:
Reference wavelength is 587.6 nm (d-line).
The effective radius of Surface 3 is 0.420 mm.

TABLE 2

Aspheric Coefficients

| Surface # | 2 | 3 | 4 | 5 |
|---|---|---|---|---|
| k = | −1.1513E+00 | −8.8034E+01 | −1.5557E+01 | −1.9630E+01 |
| A4 = | 2.1559E−01 | 1.0481E+00 | −5.2074E−01 | −8.0509E−02 |
| A6 = | 2.7906E+00 | −1.5824E+01 | −1.4289E+01 | −9.1600E+00 |
| A8 = | −3.0003E+01 | 1.5625E+02 | 1.8341E+02 | 8.0957E+01 |
| A10 = | 1.7781E+02 | −1.1705E+03 | −1.5510E+03 | −4.0631E+02 |
| A12 = | −5.1385E+02 | 4.4617E+03 | 6.7866E+03 | 1.1906E+03 |
| A14 = | 5.3147E+02 | −6.8330E+03 | −1.1151E+04 | −1.0393E+03 |

| Surface # | 6 | 7 | 8 | 9 |
|---|---|---|---|---|
| k = | −8.2701E+01 | −3.9456E+00 | −1.0543E+01 | −3.8582E+00 |
| A4 = | 1.8731E+00 | 1.7226E−01 | −1.7679E+00 | −1.5882E+00 |
| A6 = | −1.8480E+01 | 4.8040E+00 | 4.1496E+00 | 4.1663E+00 |
| A8 = | 1.2379E+02 | −3.6457E+01 | −7.5147E+00 | −8.4526E+00 |
| A10 = | −6.8441E+02 | 1.0829E+02 | 1.1079E+01 | 1.0955E+01 |
| A12 = | 2.3085E+03 | −1.7997E+02 | −1.0597E+01 | −8.3515E+00 |
| A14 = | −4.2996E+03 | 1.6462E+02 | 5.5149E+00 | 3.3893E+00 |
| A16 = | 3.3215E+03 | −6.3594E+01 | −1.1819E+00 | −5.6217E−01 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
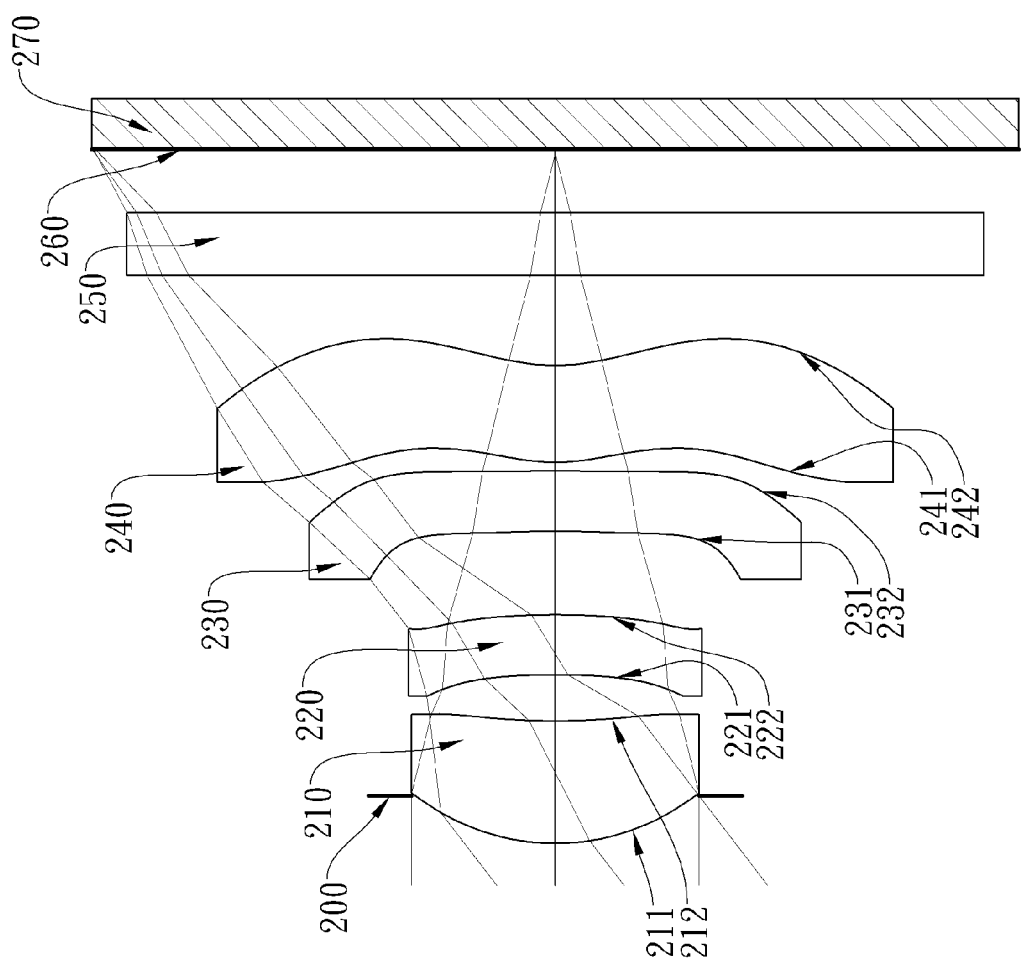
FIG. 2A is a schematic view of an imaging device according to the 2nd embodiment of the present disclosure.
Figure 2B:
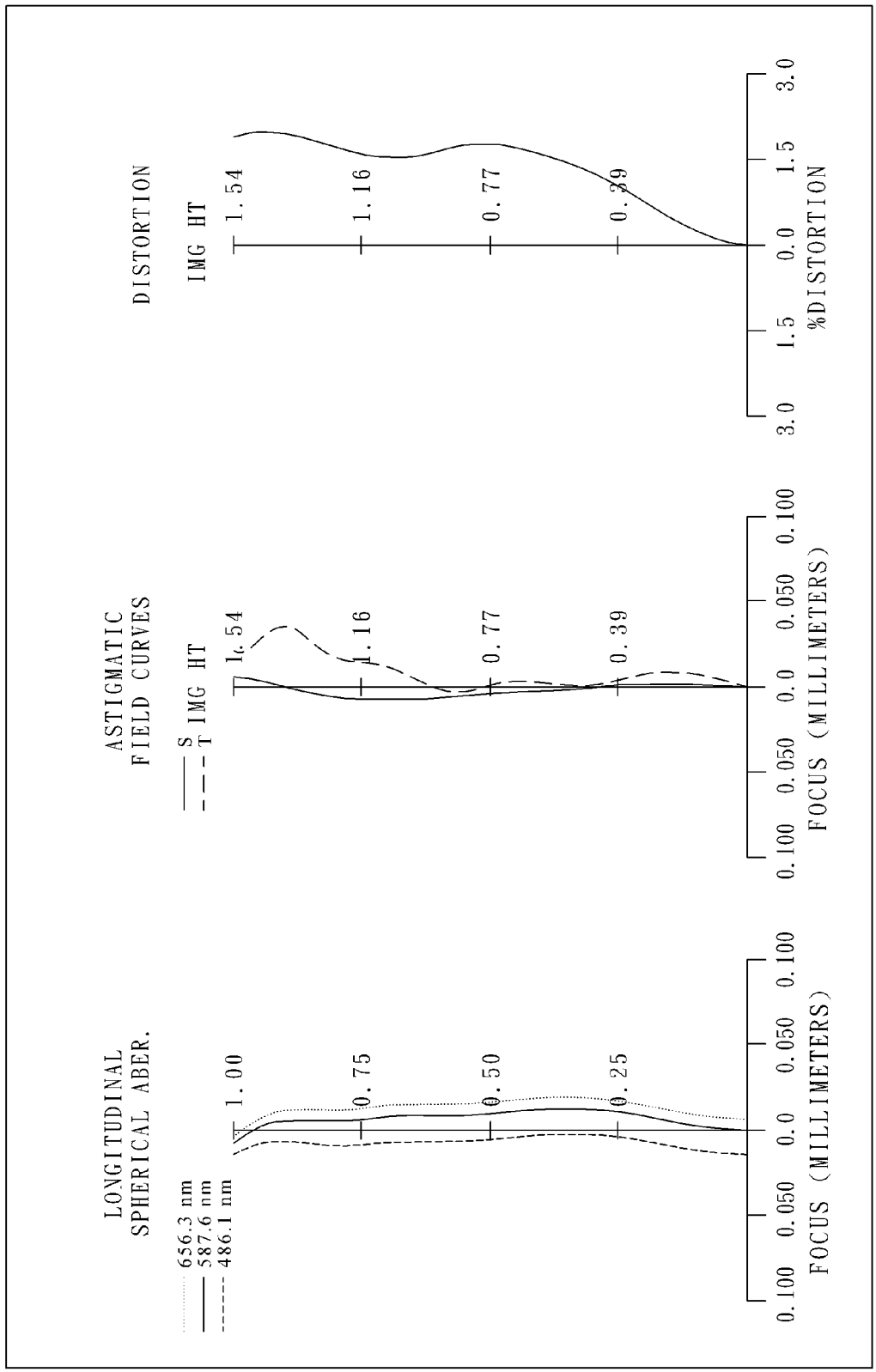
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging device according to the 2nd embodiment.

In FIG. 2A, the imaging device includes the image capturing lens system (not otherwise herein labeled) of the present disclosure and an image sensor 270. The image capturing lens system includes, in order from an object side to an image side, an aperture stop 200, a first lens element 210, a second lens element 220, a third lens element 230, a fourth lens element 240, an IR-cut filter 250 and an image plane 260, wherein the image capturing lens system has a total of four lens elements (210-240) with refractive power.

The first lens element 210 with positive refractive power has an object-side surface 211 being convex in a paraxial region thereof and an image-side surface 212 being concave in a paraxial region thereof, which are both aspheric, and the first lens element 210 is made of plastic material.

The second lens element 220 with positive refractive power has an object-side surface 221 being concave in a paraxial region thereof and an image-side surface 222 being convex in a paraxial region thereof, which are both aspheric, and the second lens element 220 is made of plastic material. Furthermore, the image-side surface 222 of the second lens element 220 has at least one concave shape in an off-axis region thereof.

The third lens element 230 with negative refractive power has an object-side surface 231 being concave in a paraxial region thereof and an image-side surface 232 being concave in a paraxial region thereof, which are both aspheric, and the third lens element 230 is made of plastic material. Furthermore, the image-side surface 232 of the third lens element 230 has at least one convex shape in an off-axis region thereof.

The fourth lens element 240 with positive refractive power has an object-side surface 241 being convex in a paraxial region thereof and an image-side surface 242 being concave in a paraxial region thereof, which are both aspheric, and the fourth lens element 240 is made of plastic material. Furthermore, the image-side surface 242 of the fourth lens element 240 has at least one convex shape in an off-axis region thereof.

The IR-cut filter 250 is made of glass and located between the fourth lens element 240 and the image plane 260, and will not affect the focal length of the image capturing lens system. The image sensor 270 is disposed on the image plane 260 of the image capturing lens system.

The detailed optical data of the 2nd embodiment are shown in Table 3 and the aspheric surface data are shown in Table 4 below.

TABLE 3

2nd Embodiment
f = 1.97 mm, Fno = 2.06, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 0.750 | ASP | 0.408 | Plastic | 1.544 | 55.9 | 1.91 |
| 3 | | 2.164 | ASP | 0.154 | | | | |
| 4 | Lens 2 | −2.600 | ASP | 0.200 | Plastic | 1.640 | 23.3 | 1022.29 |
| 5 | | −2.667 | ASP | 0.279 | | | | |
| 6 | Lens 3 | −2.408 | ASP | 0.200 | Plastic | 1.640 | 23.3 | −3.72 |
| 7 | | 200.000 | ASP | 0.030 | | | | |
| 8 | Lens 4 | 0.639 | ASP | 0.323 | Plastic | 1.544 | 55.9 | 5.88 |
| 9 | | 0.656 | ASP | 0.300 | | | | |
| 10 | IR-cut filter | Plano | | 0.210 | Glass | 1.517 | 64.2 | — |
| 11 | | Plano | | 0.209 | | | | |
| 12 | Image | Plano | | — | | | | |

Note:
Reference wavelength is 587.6 nm (d-line).
The effective radius of Surface 3 is 0.420 mm.

TABLE 4

Aspheric Coefficients

| Surface # | 2 | 3 | 4 | 5 |
|---|---|---|---|---|
| k = | −1.1622E+00 | −8.8051E+01 | −1.1617E+01 | −1.9029E+01 |
| A4 = | 2.0541E−01 | 1.0446E+00 | −5.5791E−01 | −1.3183E−01 |
| A6 = | 3.1207E+00 | −1.5564E+01 | −1.2268E+01 | −8.6625E+00 |
| A8 = | −3.4148E+01 | 1.5229E+02 | 1.5471E+02 | 7.9273E+01 |
| A10 = | 2.0390E+02 | −1.1414E+03 | −1.3273E+03 | −4.0129E+02 |
| A12 = | −5.9566E+02 | 4.3618E+03 | 5.9144E+03 | 1.1802E+03 |
| A14 = | 6.3289E+02 | −6.6974E+03 | −9.8182E+03 | −1.0321E+03 |

| Surface # | 6 | 7 | 8 | 9 |
|---|---|---|---|---|
| k = | −9.0000E+01 | −9.0000E+01 | −8.8269E+00 | −2.1659E+00 |
| A4 = | 2.1253E+00 | −6.9346E−01 | −2.0133E+00 | −2.1956E+00 |
| A6 = | −2.3195E+01 | 9.0311E+00 | 4.7408E+00 | 5.6967E+00 |
| A8 = | 1.6601E+02 | −5.1989E+01 | −8.2378E+00 | −1.1128E+01 |
| A10 = | −9.1074E+02 | 1.4798E+02 | 1.1518E+01 | 1.4163E+01 |
| A12 = | 3.0332E+03 | −2.4303E+02 | −1.0634E+01 | −1.0754E+01 |
| A14 = | −5.5511E+03 | 2.1845E+02 | 5.4211E+00 | 4.3785E+00 |
| A16 = | 4.1972E+03 | −8.2127E+01 | −1.1478E+00 | −7.3142E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.97 | CT1/(CT2 + CT3) | 1.02 |
| Fno | 2.06 | |f/R6| | 0.01 |
| HFOV [deg.] | 37.4 | |f1/f2| | 0.00 |
| V2 | 23.3 | |f3/f2| | 0.00 |
| (V2 + V3)/V1 | 0.83 | Y32/CT3 | 4.10 |
| T23/T12 | 1.81 | | |

3rd Embodiment

Figure 3A:
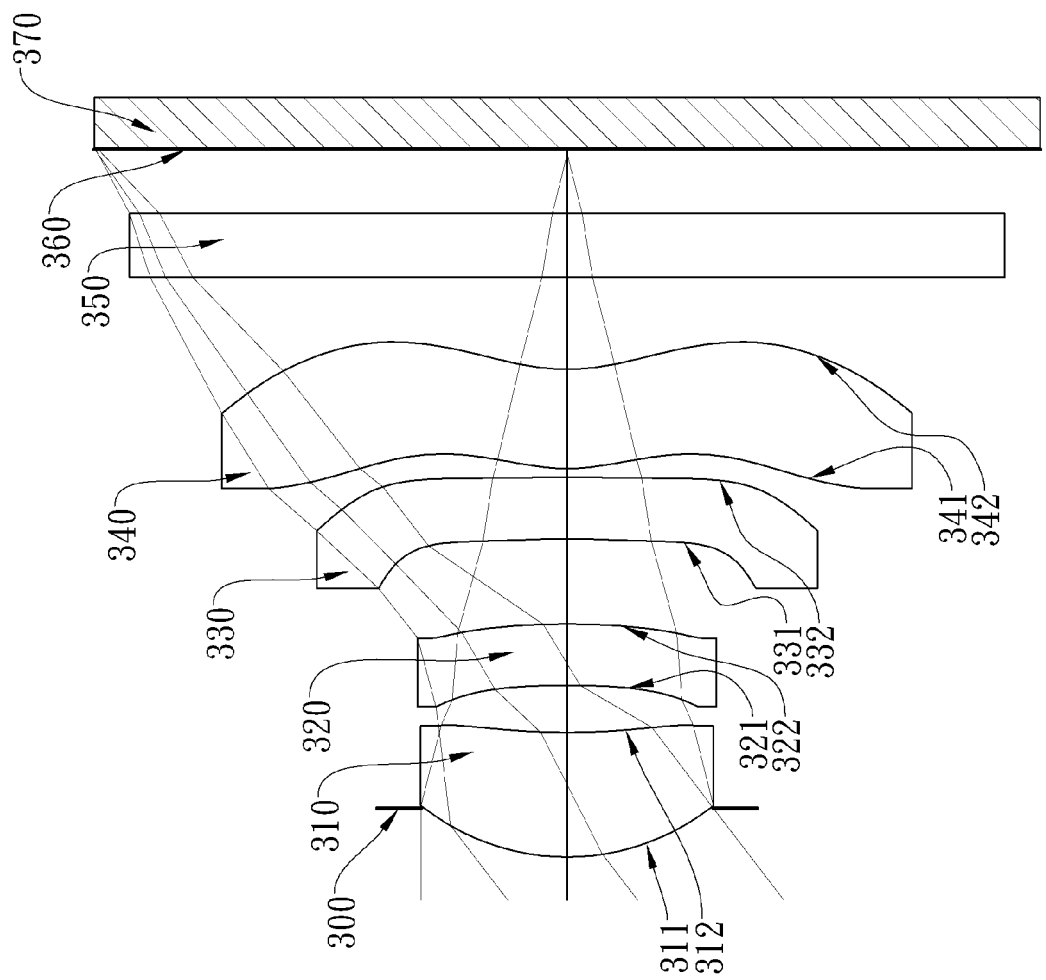
FIG. 3A is a schematic view of an imaging device according to the 3rd embodiment of the present disclosure.
Figure 3B:
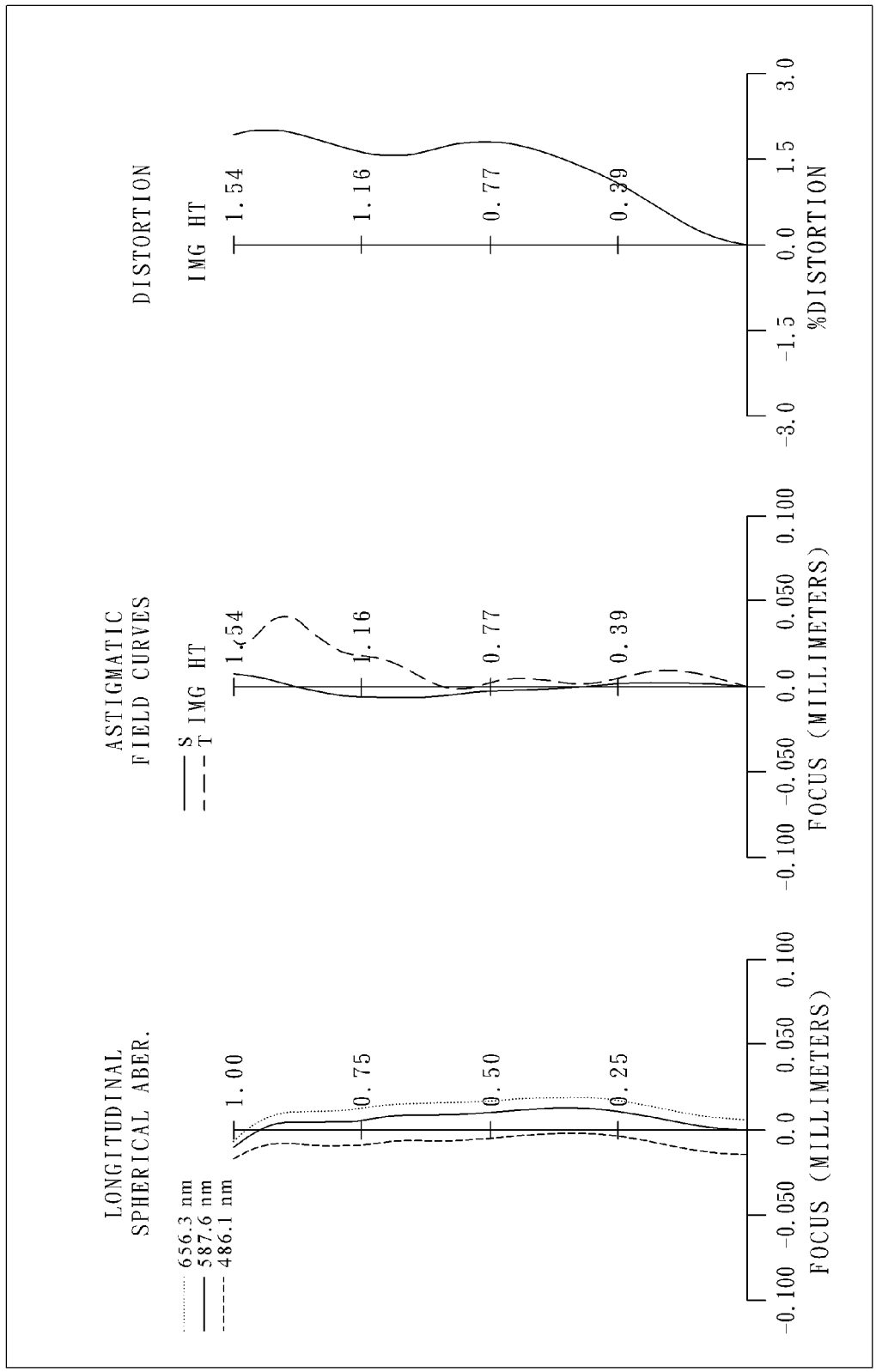
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging device according to the 3rd embodiment.

In FIG. 3A, the imaging device includes the image capturing lens system (not otherwise herein labeled) of the present disclosure and an image sensor 370. The image capturing lens system includes, in order from an object side to an image side, an aperture stop 300, a first lens element 310, a second lens element 320, a third lens element 330, a fourth lens element 340, an IR-cut filter 350 and an image plane 360, wherein the image capturing lens system has a total of four lens elements (310-340) with refractive power.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with positive refractive power has an object-side surface 321 being concave in a paraxial region thereof and an image-side surface 322 being convex in a paraxial region thereof, which are both aspheric, and the second lens element 320 is made of plastic material. Furthermore, the image-side surface 322 of the second lens element 320 has at least one concave shape in an off-axis region thereof.

The third lens element 330 with negative refractive power has an object-side surface 331 being concave in a paraxial region thereof and an image-side surface 332 being concave in a paraxial region thereof, which are both aspheric, and the third lens element 330 is made of plastic material. Furthermore, the image-side surface 332 of the third lens element 330 has at least one convex shape in an off-axis region thereof.

The fourth lens element 340 with positive refractive power has an object-side surface 341 being convex in a paraxial region thereof and an image-side surface 342 being concave in a paraxial region thereof, which are both aspheric, and the fourth lens element 340 is made of plastic material. Furthermore, the image-side surface 342 of the fourth lens element 340 has at least one convex shape in an off-axis region thereof.

The IR-cut filter 350 is made of glass and located between the fourth lens element 340 and the image plane 360, and will not affect the focal length of the image capturing lens system. The image sensor 370 is disposed on the image plane 360 of the image capturing lens system.

The detailed optical data of the 3rd embodiment are shown in Table 5 and the aspheric surface data are shown in Table 6 below.

TABLE 5

3rd Embodiment
f = 1.97 mm, Fno = 2.06, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.159 | | | | |
| 2 | Lens 1 | 0.749 | ASP | 0.407 | Plastic | 1.544 | 55.9 | 1.93 |
| 3 | | 2.126 | ASP | 0.154 | | | | |
| 4 | Lens 2 | −2.745 | ASP | 0.200 | Plastic | 1.640 | 23.3 | 198.90 |
| 5 | | −2.764 | ASP | 0.279 | | | | |
| 6 | Lens 3 | −2.297 | ASP | 0.200 | Plastic | 1.640 | 23.3 | −3.55 |
| 7 | | 200.000 | ASP | 0.030 | | | | |
| 8 | Lens 4 | 0.627 | ASP | 0.324 | Plastic | 1.544 | 55.9 | 5.38 |
| 9 | | 0.653 | ASP | 0.300 | | | | |
| 10 | IR-cut filter | Plano | | 0.210 | Glass | 1.517 | 64.2 | — |
| 11 | | Plano | | 0.208 | | | | |
| 12 | Image | Plano | | — | | | | |

Note:
Reference wavelength is 587.6 nm (d-line).
The effective radius of Surface 3 is 0.420 mm.

TABLE 6

Aspheric Coefficients

| Surface # | 2 | 3 | 4 | 5 |
|---|---|---|---|---|
| k = | −1.1604E+00 | −8.8051E+01 | −1.2113E+01 | −1.9752E+01 |
| A4 = | 2.0512E−01 | 1.1127E+00 | −5.2386E−01 | −1.0364E−01 |
| A6 = | 3.1554E+00 | −1.6458E+01 | −1.2974E+01 | −9.0172E+00 |
| A8 = | −3.4750E+01 | 1.6145E+02 | 1.6586E+02 | 8.2146E+01 |
| A10 = | 2.0912E+02 | −1.1983E+03 | −1.4235E+03 | −4.1782E+02 |
| A12 = | −6.1663E+02 | 4.5540E+03 | 6.3032E+03 | 1.2232E+03 |
| A14 = | 6.6593E+02 | −6.9693E+03 | −1.0416E+04 | −1.0666E+03 |

| Surface # | 6 | 7 | 8 | 9 |
|---|---|---|---|---|
| k = | −9.0000E+01 | −1.0000E+00 | −8.8175E+00 | −1.6809E+00 |
| A4 = | 2.0640E+00 | −8.5491E−01 | −2.0545E+00 | −2.4150E+00 |
| A6 = | −2.2975E+01 | 1.0362E+01 | 5.0252E+00 | 6.1339E+00 |
| A8 = | 1.6858E+02 | −5.7626E+01 | −9.0422E+00 | −1.1769E+01 |
| A10 = | −9.4157E+02 | 1.6212E+02 | 1.2686E+01 | 1.4806E+01 |
| A12 = | 3.1679E+03 | −2.6463E+02 | −1.1561E+01 | −1.1158E+01 |
| A14 = | −5.8363E+03 | 2.3707E+02 | 5.8056E+00 | 4.5205E+00 |
| A16 = | 4.4370E+03 | −8.9033E+01 | −1.2132E+00 | −7.5262E−01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.97 | CT1/(CT2 + CT3) | 1.02 |
| Fno | 2.06 | |f/R6| | 0.01 |
| HFOV [deg.] | 37.5 | |f1/f2| | 0.01 |
| V2 | 23.3 | |f3/f2| | 0.02 |
| (V2 + V3)/V1 | 0.83 | Y32/CT3 | 4.09 |
| T23/T12 | 1.81 | | |

4th Embodiment

Figure 4A:
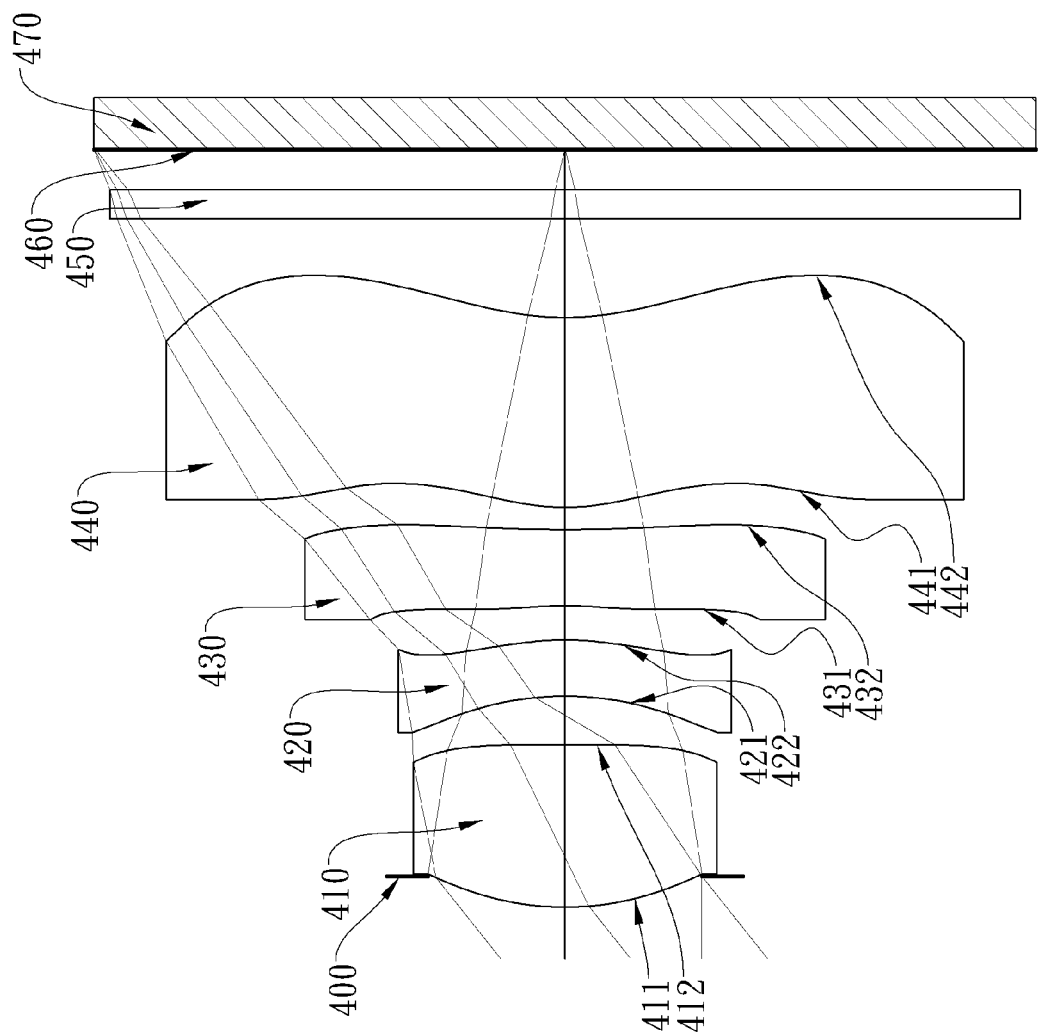
FIG. 4A is a schematic view of an imaging device according to the 4th embodiment of the present disclosure.
Figure 4B:
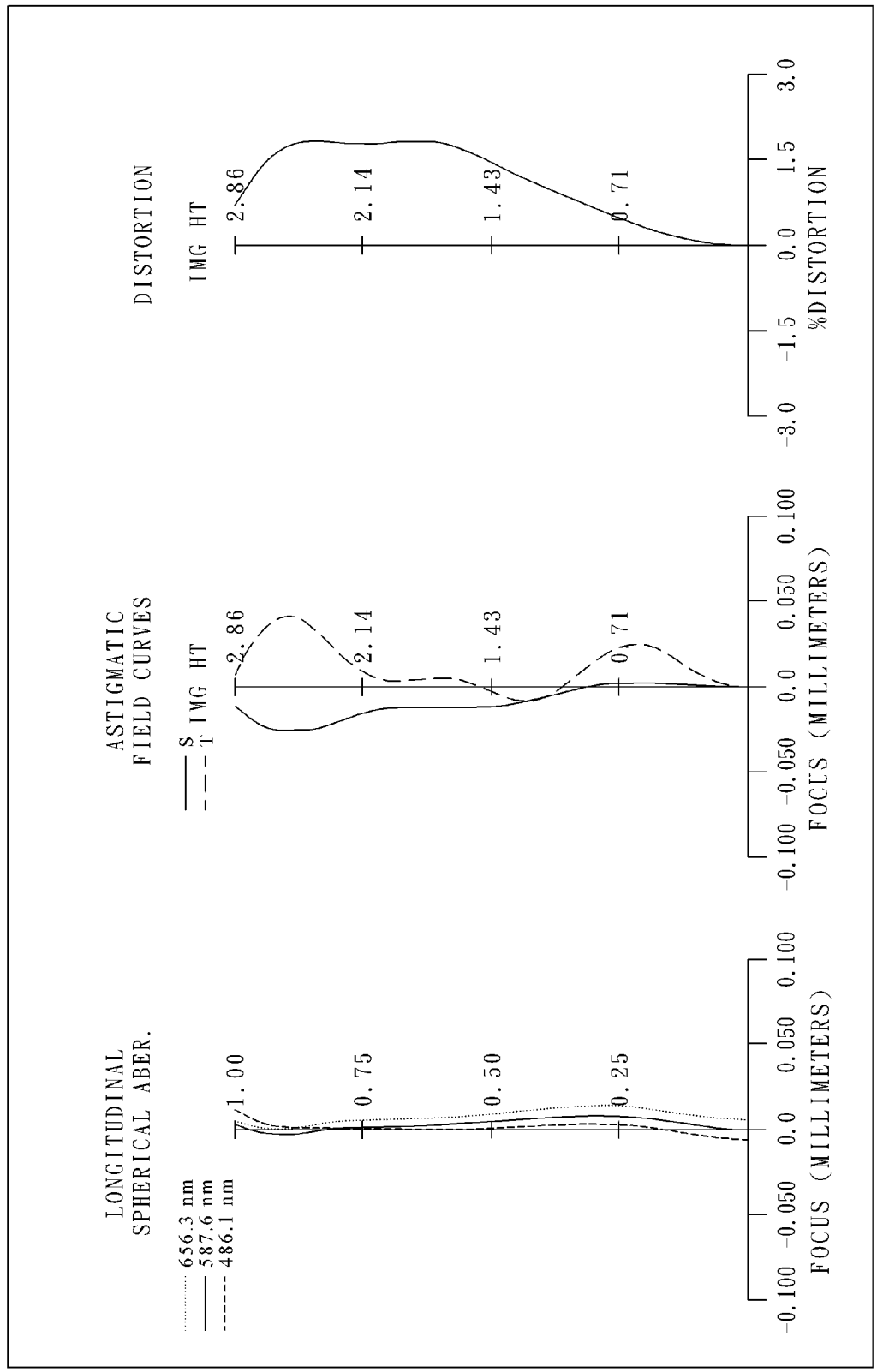
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging device according to the 4th embodiment.

In FIG. 4A, the imaging device includes the image capturing lens system (not otherwise herein labeled) of the present disclosure and an image sensor 470. The image capturing lens system includes, in order from an object side to an image side, an aperture stop 400, a first lens element 410, a second lens element 420, a third lens element 430, a fourth lens element 440, an IR-cut filter 450 and an image plane 460, wherein the image capturing lens system has a total of four lens elements (410-440) with refractive power.

The first lens element 410 with positive refractive power has an object-side surface 411 being convex in a paraxial region thereof and an image-side surface 412 being convex in a paraxial region thereof, which are both aspheric, and the first lens element 410 is made of plastic material.

The second lens element 420 with positive refractive power has an object-side surface 421 being concave in a paraxial region thereof and an image-side surface 422 being convex in a paraxial region thereof, which are both aspheric, and the second lens element 420 is made of plastic material. Furthermore, the image-side surface 422 of the second lens element 420 has at least one concave shape in an off-axis region thereof.

The third lens element 430 with negative refractive power has an object-side surface 431 being concave in a paraxial region thereof and an image-side surface 432 being concave in a paraxial region thereof, which are both aspheric, and the third lens element 430 is made of plastic material. Furthermore, the image-side surface 432 of the third lens element 430 has at least one convex shape in an off-axis region thereof.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic material. Furthermore, the image-side surface 442 of the fourth lens element 440 has at least one convex shape in an off-axis region thereof.

The IR-cut filter 450 is made of glass and located between the fourth lens element 440 and the image plane 460, and will not affect the focal length of the image capturing lens system. The image sensor 470 is disposed on the image plane 460 of the image capturing lens system.

The detailed optical data of the 4th embodiment are shown in Table 7 and the aspheric surface data are shown in Table 8 below.

TABLE 7

4th Embodiment
f = 3.57 mm, Fno = 2.15, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.187 | | | | |
| 2 | Lens 1 | 1.705 | ASP | 0.987 | Plastic | 1.544 | 55.9 | 3.08 |
| 3 | | −77.224 | ASP | 0.294 | | | | |
| 4 | Lens 2 | −1.860 | ASP | 0.342 | Plastic | 1.650 | 21.4 | 12.94 |
| 5 | | −1.633 | ASP | 0.207 | | | | |
| 6 | Lens 3 | −2.277 | ASP | 0.462 | Plastic | 1.650 | 21.4 | −2.73 |
| 7 | | 8.608 | ASP | 0.136 | | | | |
| 8 | Lens 4 | 1.278 | ASP | 1.152 | Plastic | 1.544 | 55.9 | 4.85 |
| 9 | | 1.690 | ASP | 0.600 | | | | |
| 10 | IR-cut filter | Plano | | 0.175 | Glass | 1.517 | 64.2 | — |
| 11 | | Plano | | 0.244 | | | | |
| 12 | Image | Plano | | — | | | | |

Note:
Reference wavelength is 587.6 nm (d-line).
The effective radius of Surface 3 is 0.920 mm.

TABLE 8

Aspheric Coefficients

| Surface # | 2 | 3 | 4 | 5 |
|---|---|---|---|---|
| k = | −1.5284E+00 | −8.2321E+01 | −1.0023E+01 | −2.0154E+01 |
| A4 = | 1.5555E−02 | −7.6790E−02 | −9.4993E−02 | 9.6516E−02 |

TABLE 8-continued

| Aspheric Coefficients | | | | |
|---|---|---|---|---|
| A6 = | 9.7750E−02 | −1.8037E−01 | −3.2447E−01 | −1.8855E−01 |
| A8 = | −6.3546E−01 | 4.2528E−01 | 9.4593E−01 | −1.1584E−02 |
| A10 = | 2.0154E+00 | −1.0276E+00 | −1.1306E+00 | 8.4592E−01 |
| A12 = | −3.6192E+00 | 1.5471E+00 | 9.9050E−01 | −1.1696E+00 |
| A14 = | 3.3717E+00 | −1.2251E+00 | −6.7804E−01 | 6.5693E−01 |
| A16 = | −1.2859E+00 | 3.9146E−01 | 2.3177E−01 | −1.3372E−01 |
| Surface # | 6 | 7 | 8 | 9 |
| k = | −5.3050E+01 | −1.9320E+01 | −7.7346E+00 | −4.8589E+00 |
| A4 = | 4.4672E−01 | −1.7514E−02 | −1.3867E−01 | −6.0893E−02 |
| A6 = | −1.0158E+00 | −2.1604E−02 | 8.2564E−02 | 2.1397E−02 |
| A8 = | 1.3693E+00 | 3.7506E−02 | −6.5904E−02 | −6.8009E−03 |
| A10 = | −1.1979E+00 | −4.1191E−02 | 3.6469E−02 | 9.2734E−04 |
| A12 = | 6.0287E−01 | 2.3609E−02 | −1.0566E−02 | 4.8994E−05 |
| A14 = | −1.4062E−01 | −6.5424E−03 | 1.5115E−03 | −2.7070E−05 |
| A16 = | 5.3058E−03 | 6.8712E−04 | −8.5167E−05 | 2.0278E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.57 | CT1/(CT2 + CT3) | 1.23 |
| Fno | 2.15 | |f/R6| | 0.41 |
| HFOV [deg.] | 38.4 | |f1/f2| | 0.24 |
| V2 | 21.4 | |f3/f2| | 0.21 |
| (V2 + V3)/V1 | 0.77 | Y32/CT3 | 3.42 |
| T23/T12 | 0.70 | | |

5th Embodiment

Figure 5A:
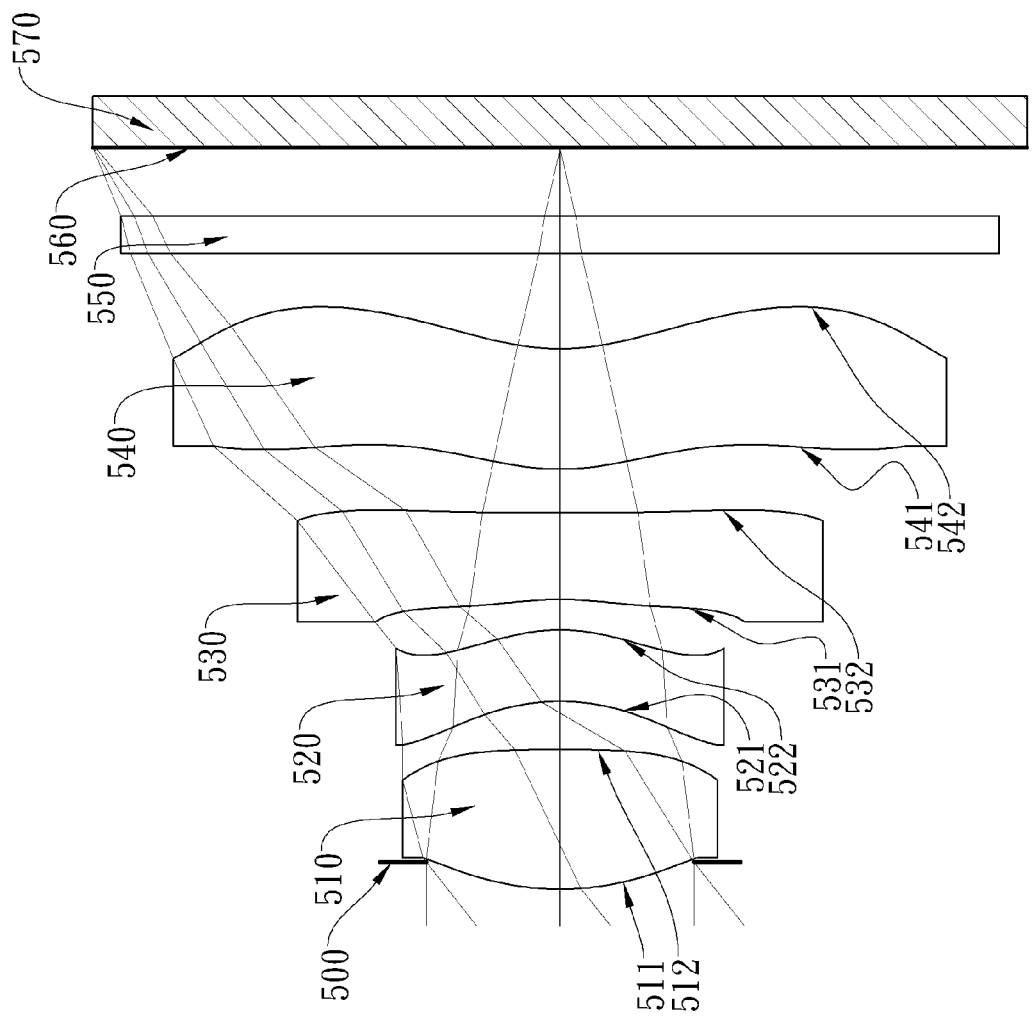
FIG. 5A is a schematic view of an imaging device according to the 5th embodiment of the present disclosure.
Figure 5B:
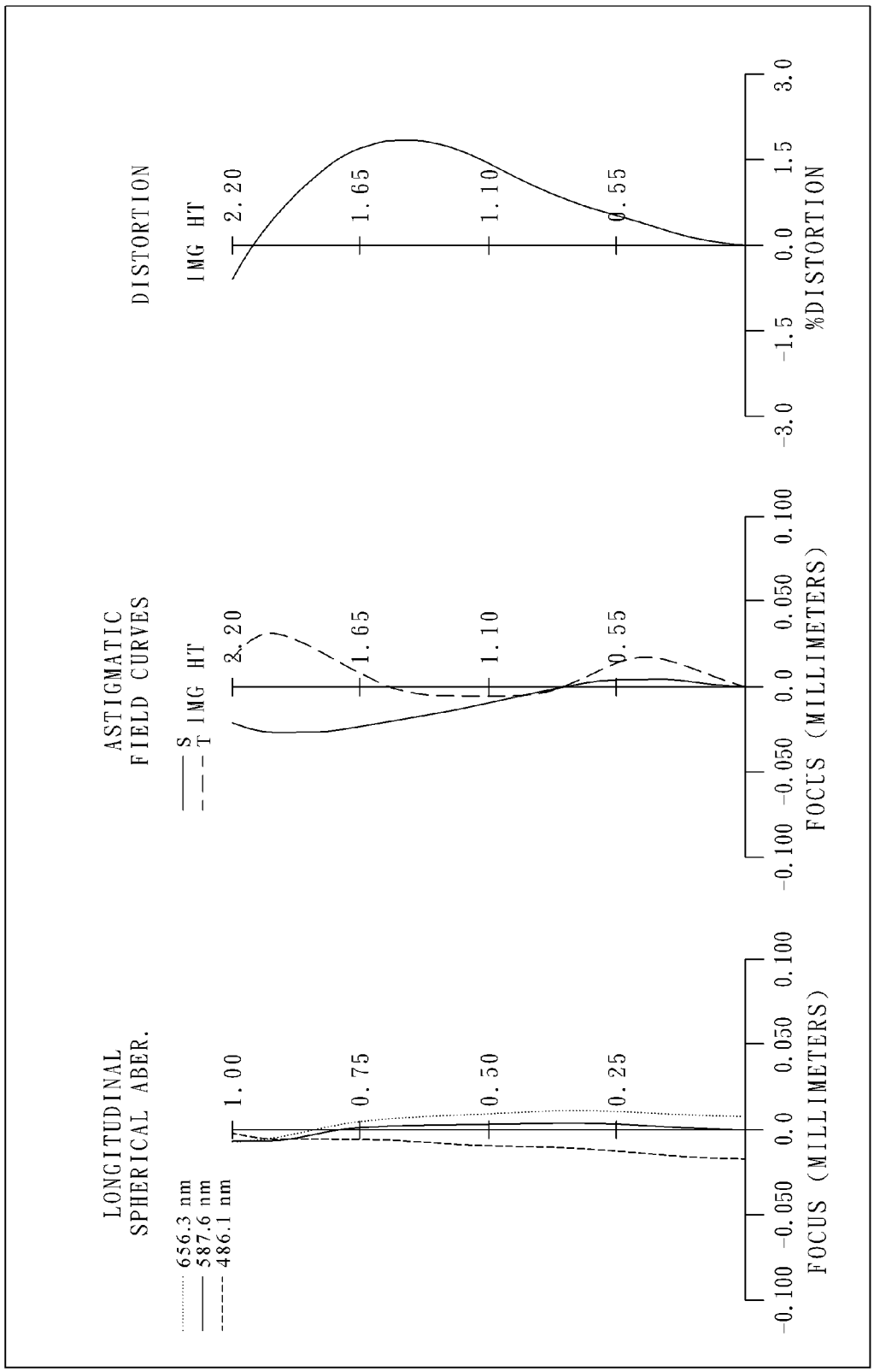
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging device according to the 5th embodiment.

In FIG. 5A, the imaging device includes the image capturing lens system (not otherwise herein labeled) of the present disclosure and an image sensor 570. The image capturing lens system includes, in order from an object side to an image side, an aperture stop 500, a first lens element 510, a second lens element 520, a third lens element 530, a fourth lens element 540, an IR-cut filter 550 and an image plane 560, wherein the image capturing lens system has a total of four lens elements (510-540) with refractive power.

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with positive refractive power has an object-side surface 521 being concave in a paraxial region thereof and an image-side surface 522 being convex in a paraxial region thereof, which are both aspheric, and the second lens element 520 is made of plastic material. Furthermore, the image-side surface 522 of the second lens element 520 has at least one concave shape in an off-axis region thereof.

The third lens element 530 with negative refractive power has an object-side surface 531 being concave in a paraxial region thereof and an image-side surface 532 being planar in a paraxial region thereof, which are both aspheric, and the third lens element 530 is made of plastic material. Furthermore, the image-side surface 532 of the third lens element 530 has at least one convex shape in an off-axis region thereof.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic material. Furthermore, the image-side surface 542 of the fourth lens element 540 has at least one convex shape in an off-axis region thereof.

The IR-cut filter 550 is made of glass and located between the fourth lens element 540 and the image plane 560, and will not affect the focal length of the image capturing lens system. The image sensor 570 is disposed on the image plane 560 of the image capturing lens system.

The detailed optical data of the 5th embodiment are shown in Table 9 and the aspheric surface data are shown in Table 10 below.

TABLE 9

5th Embodiment
f = 2.80 mm, Fno = 2.22, HFOV = 38.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.128 | | | | |

TABLE 9-continued

5th Embodiment
f = 2.80 mm, Fno = 2.22, HFOV = 38.3 deg.

| Surface # | | Curvature Radius | | Thickness | Material | Index | Abbe # | Focal Length |
|---|---|---|---|---|---|---|---|---|
| 2 | Lens 1 | 1.306 | ASP | 0.659 | Plastic | 1.544 | 55.9 | 2.17 |
| 3 | | −10.090 | ASP | 0.227 | | | | |
| 4 | Lens 2 | −1.002 | ASP | 0.338 | Plastic | 1.634 | 23.8 | 3.79 |
| 5 | | −0.800 | ASP | 0.144 | | | | |
| 6 | Lens 3 | −1.320 | ASP | 0.408 | Plastic | 1.634 | 23.8 | −2.08 |
| 7 | | ∞ | ASP | 0.206 | | | | |
| 8 | Lens 4 | 1.104 | ASP | 0.568 | Plastic | 1.535 | 55.7 | 14.45 |
| 9 | | 1.057 | ASP | 0.450 | | | | |
| 10 | IR-cut filter | Plano | | 0.175 | Glass | 1.517 | 64.2 | — |
| 11 | | Plano | | 0.325 | | | | |
| 12 | Image | Plano | | — | | | | |

Note:
Reference wavelength is 587.6 nm (d-line).

TABLE 10

Aspheric Coefficients

| Surface # | 2 | 3 | 4 | 5 |
|---|---|---|---|---|
| k = | −1.5129E+00 | −3.7931E+01 | −2.1436E+00 | −5.9982E+00 |
| A4 = | 2.8558E−02 | −2.4625E−01 | −6.5474E−02 | 2.7350E−01 |
| A6 = | 3.5112E−02 | −6.2599E−01 | −5.2105E−01 | −6.1322E−01 |
| A8 = | −7.8922E−01 | 1.4205E+00 | 4.1057E+00 | 2.0720E+00 |
| A10 = | 1.4215E+00 | −3.9616E+00 | −8.4082E+00 | −5.8726E−01 |
| A12 = | −5.7288E−01 | 1.0338E+01 | 1.1251E+01 | −3.4070E+00 |
| A14 = | −3.9443E+00 | −1.3716E+01 | −1.0601E+01 | 4.9886E+00 |
| A16 = | 3.1711E+00 | 6.1682E+00 | 4.7340E+00 | −2.0533E+00 |

| Surface # | 6 | 7 | 8 | 9 |
|---|---|---|---|---|
| k = | −2.3677E+01 | −1.0000E+00 | −9.1220E+00 | −5.9058E+00 |
| A4 = | 9.4120E−01 | 1.2293E−01 | −2.0233E−01 | −1.4542E−01 |
| A6 = | −3.4881E+00 | −2.8911E−01 | 7.9213E−02 | 9.6653E−02 |
| A8 = | 7.9043E+00 | 4.0318E−01 | −2.1769E−03 | −7.1235E−02 |
| A10 = | −1.2193E+01 | −4.1189E−01 | −8.3816E−04 | 3.8053E−02 |
| A12 = | 1.1040E+01 | 2.5872E−01 | −2.0127E−03 | −1.3144E−02 |
| A14 = | −4.7636E+00 | −8.7395E−02 | 7.8774E−04 | 2.5107E−03 |
| A16 = | 3.5024E−01 | 1.1735E−02 | −8.4295E−05 | −1.9442E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.80 | CT1/(CT2 + CT3) | 0.88 |
| Fno | 2.22 | |f/R6| | 0.00 |
| HFOV [deg.] | 38.3 | |f1/f2| | 0.57 |
| V2 | 23.8 | |f3/f2| | 0.55 |
| (V2 + V3)/V1 | 0.85 | Y32/CT3 | 3.03 |
| T23/T12 | 0.63 | | |

6th Embodiment

Figure 6A:
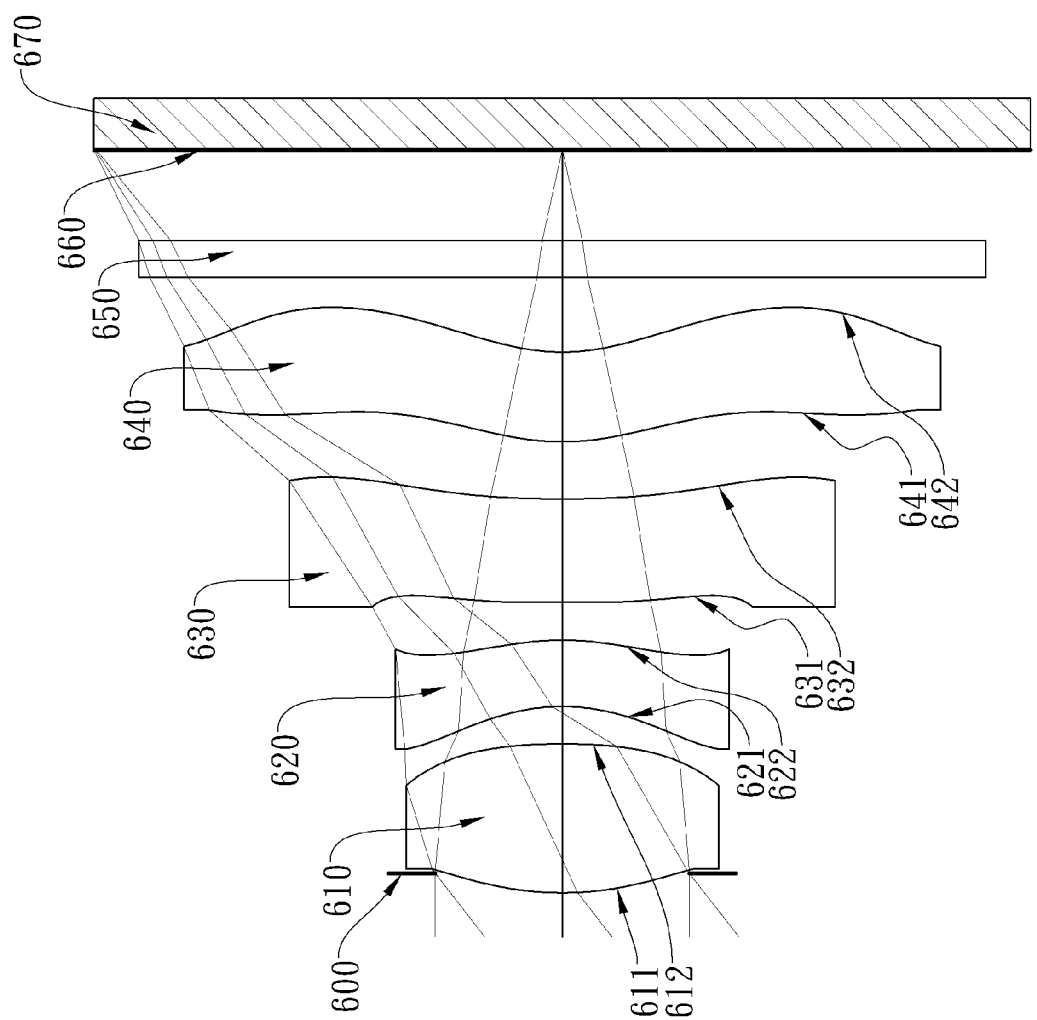
FIG. 6A is a schematic view of an imaging device according to the 6th embodiment of the present disclosure.
Figure 6B:
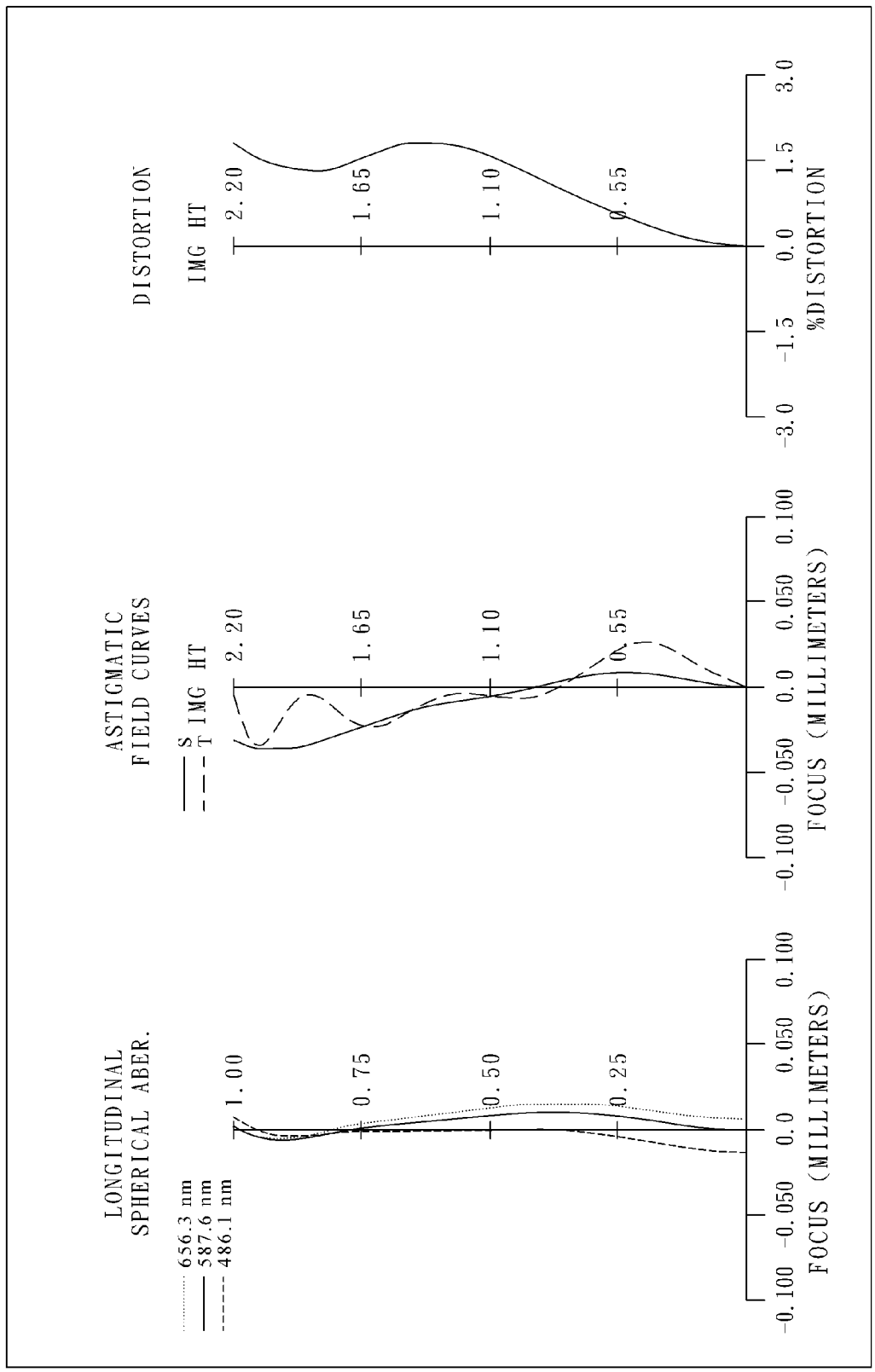
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging device according to the 6th embodiment.

In FIG. 6A, the imaging device includes the image capturing lens system (not otherwise herein labeled) of the present disclosure and an image sensor 670. The image capturing lens system includes, in order from an object side to an image side, an aperture stop 600, a first lens element 610, a second lens element 620, a third lens element 630, a fourth lens element 640, an IR-cut filter 650 and an image plane 660, wherein the image capturing lens system has a total of four lens elements (610-640) with refractive power.

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being concave in a paraxial region thereof and an image-side surface 622 being convex in a paraxial region thereof, which are both aspheric, and the second lens element 620 is made of plastic material. Furthermore, the image-side surface 622 of the second lens element 620 has at least one concave shape in an off-axis region thereof.

The third lens element 630 with negative refractive power has an object-side surface 631 being concave in a paraxial region thereof and an image-side surface 632 being concave in a paraxial region thereof, which are both aspheric, and the third lens element 630 is made of plastic material. Furthermore, the image-side surface 632 of the third lens element 630 has at least one convex shape in an off-axis region thereof.

The fourth lens element 640 with negative refractive power has an object-side surface 641 being convex in a paraxial region thereof and an image-side surface 642 being concave in a paraxial region thereof, which are both aspheric, and the fourth lens element 640 is made of plastic material. Furthermore, the image-side surface 642 of the fourth lens element 640 has at least one convex shape in an off-axis region thereof.

The IR-cut filter 650 is made of glass and located between the fourth lens element 640 and the image plane 660, and will not affect the focal length of the image capturing lens system. The image sensor 670 is disposed on the image plane 660 of the image capturing lens system.

The detailed optical data of the 6th embodiment are shown in Table 11 and the aspheric surface data are shown in Table 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.76 | CT1/(CT2 + CT3) | 0.88 |
| Fno | 2.31 | |f/R6| | 0.50 |
| HFOV [deg.] | 38.0 | |f1/f2| | 0.20 |
| V2 | 23.8 | |f3/f2| | 0.78 |
| (V2 + V3)/V1 | 0.85 | Y32/CT3 | 2.64 |
| T23/T12 | 1.00 | | |

TABLE 11

6th Embodiment
f = 2.76 mm, Fno = 2.31, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.092 | | | | |
| 2 | Lens 1 | 1.471 | ASP | 0.702 | Plastic | 1.544 | 55.9 | 1.91 |
| 3 | | −2.971 | ASP | 0.177 | | | | |
| 4 | Lens 2 | −0.908 | ASP | 0.313 | Plastic | 1.634 | 23.8 | −9.35 |
| 5 | | −1.216 | ASP | 0.177 | | | | |
| 6 | Lens 3 | −29.023 | ASP | 0.488 | Plastic | 1.634 | 23.8 | −7.30 |
| 7 | | 5.538 | ASP | 0.270 | | | | |
| 8 | Lens 4 | 1.132 | ASP | 0.423 | Plastic | 1.634 | 23.8 | −91.74 |
| 9 | | 0.949 | ASP | 0.352 | | | | |
| 10 | IR-cut filter | Plano | | 0.175 | Glass | 1.517 | 64.2 | — |
| 11 | | Plano | | 0.426 | | | | |
| 12 | Image | Plano | | — | | | | |

Note:
Reference wavelength is 587.6 nm (d-line).

TABLE 12

| Aspheric Coefficients | | | | |
|---|---|---|---|---|
| Surface # | 2 | 3 | 4 | 5 |
| k = | −2.1469E+00 | −3.1147E−01 | −3.8912E+00 | −1.3183E+01 |
| A4 = | 7.6232E−03 | −2.8418E−01 | −5.8294E−02 | 2.9955E−01 |
| A6 = | 6.3164E−03 | −4.6027E−01 | −6.3560E−01 | −7.1941E−01 |
| A8 = | −9.9391E−01 | 1.5656E+00 | 3.9581E+00 | 1.8788E+00 |
| A10 = | 2.0407E+00 | −4.3983E+00 | −8.2983E+00 | −7.6061E−01 |
| A12 = | −1.5430E+00 | 1.0518E+01 | 1.2095E+01 | −3.3420E+00 |
| A14 = | −3.9444E+00 | −1.3716E+01 | −1.1461E+01 | 5.5750E+00 |
| A16 = | 3.1711E+00 | 6.1682E+00 | 4.7340E+00 | −2.4866E+00 |
| Surface # | 6 | 7 | 8 | 9 |
| k = | −1.0000E+00 | −1.0000E+00 | −5.7896E+00 | −4.7966E+00 |
| A4 = | 8.7921E−01 | 1.4987E−01 | −1.8825E−01 | −1.4835E−01 |
| A6 = | −3.4288E+00 | −3.3043E−01 | 2.2171E−02 | 3.5623E−02 |
| A8 = | 8.0027E+00 | 4.1729E−01 | 4.9551E−02 | 1.0679E−02 |
| A10 = | −1.2385E+01 | −4.1011E−01 | −2.4388E−02 | −1.5763E−02 |
| A12 = | 1.0981E+01 | 2.5678E−01 | 3.7549E−03 | 6.0143E−03 |
| A14 = | −4.6026E+00 | −8.7975E−02 | 9.9793E−05 | −8.7215E−04 |
| A16 = | 3.3332E−01 | 1.2457E−02 | −5.6978E−05 | 3.4841E−05 |

7th Embodiment

Figure 7A:
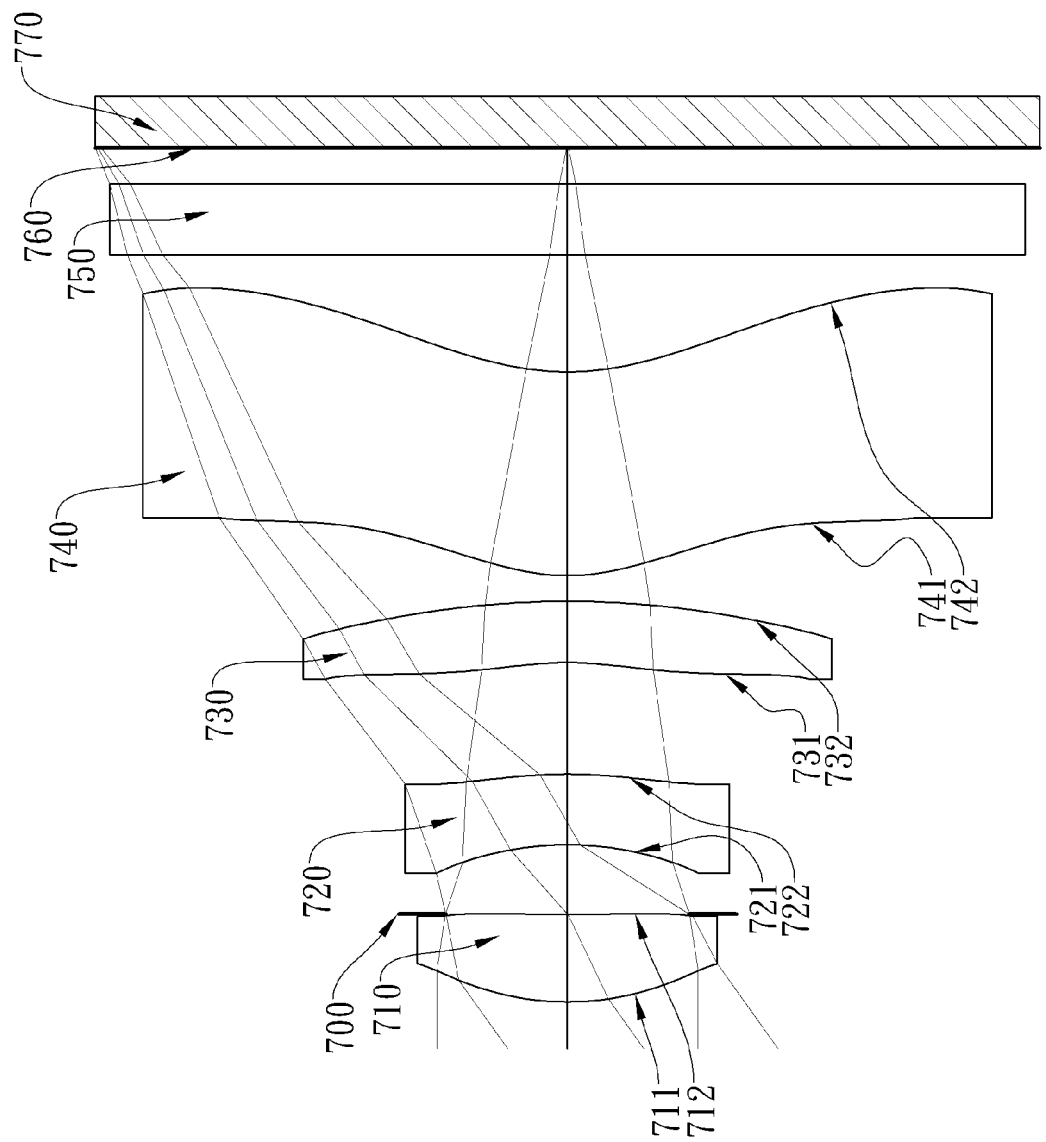
FIG. 7A is a schematic view of an imaging device according to the 7th embodiment of the present disclosure.
Figure 7B:
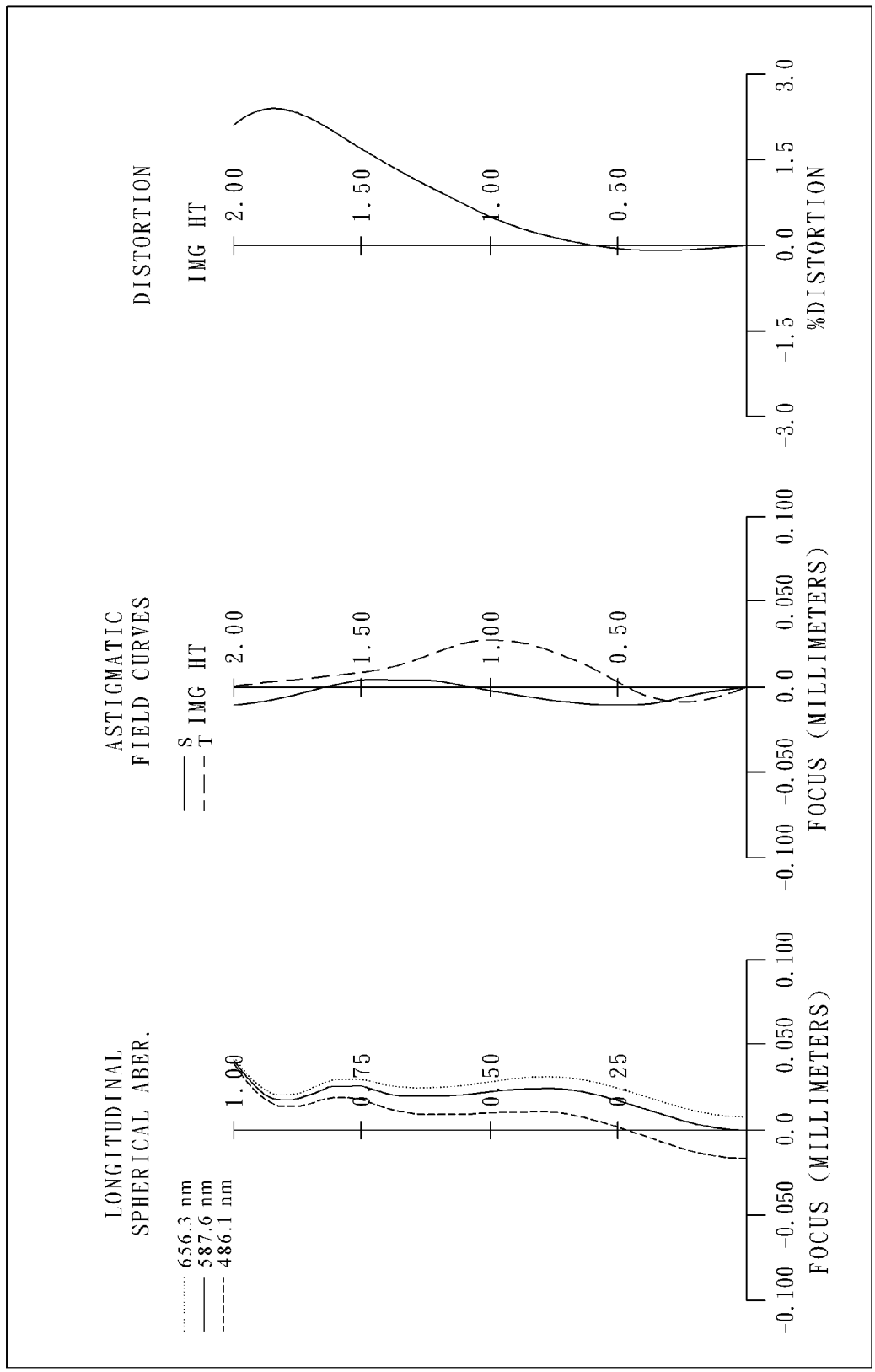
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging device according to the 7th embodiment.

In FIG. 7A, the imaging device includes the image capturing lens system (not otherwise herein labeled) of the present disclosure and an image sensor 770. The image capturing lens system includes, in order from an object side to an image side, a first lens element 710, an aperture stop 700, a second lens element 720, a third lens element 730, a fourth lens element 740, an IR-cut filter 750 and an image plane 760, wherein the image capturing lens system has a total of four lens elements (710-740) with refractive power.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being concave in a paraxial region thereof and an image-side surface 722 being convex in a paraxial region thereof, which are both aspheric, and the second lens element 720 is made of plastic material. Furthermore, the image-side surface 722 of the second lens element 720 has at least one concave shape in an off-axis region thereof.

The third lens element 730 with negative refractive power has an object-side surface 731 being concave in a paraxial region thereof and an image-side surface 732 being convex in a paraxial region thereof, which are both aspheric, and the third lens element 730 is made of plastic material.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic material. Furthermore, the image-side surface 742 of the fourth lens element 740 has at least one convex shape in an off-axis region thereof.

The IR-cut filter 750 is made of glass and located between the fourth lens element 740 and the image plane 760, and will not affect the focal length of the image capturing lens system. The image sensor 770 is disposed on the image plane 760 of the image capturing lens system.

The detailed optical data of the 7th embodiment are shown in Table 13 and the aspheric surface data are shown in Table 14 below.

TABLE 13

7th Embodiment
f = 2.73 mm, Fno = 2.45, HFOV = 35.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.189 | ASP | 0.373 | Plastic | 1.544 | 55.9 | 2.36 |
| 2 |  | 14.565 | ASP | 0.002 |  |  |  |  |
| 3 | Ape. Stop | Plano |  | 0.295 |  |  |  |  |
| 4 | Lens 2 | −1.304 | ASP | 0.301 | Plastic | 1.634 | 23.8 | −7.18 |
| 5 |  | −1.990 | ASP | 0.476 |  |  |  |  |
| 6 | Lens 3 | −1.332 | ASP | 0.261 | Plastic | 1.544 | 55.9 | −3.88 |
| 7 |  | −3.859 | ASP | 0.110 |  |  |  |  |
| 8 | Lens 4 | 0.839 | ASP | 0.869 | Plastic | 1.544 | 55.9 | 2.90 |
| 9 |  | 1.136 | ASP | 0.500 |  |  |  |  |
| 10 | IR-cut filter | Plano |  | 0.300 | Glass | 1.517 | 64.2 | — |
| 11 |  | Plano |  | 0.154 |  |  |  |  |
| 12 | Image | Plano |  | — |  |  |  |  |

Note:
Reference wavelength is 587.6 nm (d-line).

TABLE 14

Aspheric Coefficients

| Surface # | 1 | 2 | 4 | 5 |
|---|---|---|---|---|
| k = | −1.1432E+00 | −9.0000E+01 | −5.9923E+00 | −3.0026E+01 |
| A4 = | 6.8974E−02 | 3.2950E−02 | −1.0662E−01 | 1.2026E−01 |
| A6 = | 4.8658E−02 | −2.1958E+00 | −1.7749E−01 | −4.1240E−02 |
| A8 = | −2.0737E−01 | 1.4443E+01 | −6.8064E−01 | 2.9738E−01 |
| A10 = | −3.7613E−01 | −5.2107E+01 | −2.4641E+00 | −4.3030E−02 |
| A12 = | −7.6563E−01 | 6.3495E+01 | 2.1228E+01 | −3.4453E−01 |
| A14 = | −2.4506E+00 | −1.0796E−01 | −4.1081E+01 | −6.6630E−02 |
| A16 = | −4.4067E+00 | 2.1930E−02 | 1.5163E−01 | 8.9820E−01 |

| Surface # | 6 | 7 | 8 | 9 |
|---|---|---|---|---|
| k = | −3.1479E+01 | −1.0000E+00 | −6.4689E+00 | −3.9816E+00 |
| A4 = | 3.5750E−01 | 7.0281E−03 | −3.9319E−02 | −4.7913E−02 |
| A6 = | −5.8625E−01 | −1.5258E−02 | −1.2935E−01 | −1.4618E−02 |
| A8 = | 5.8878E−01 | 3.0846E−02 | 1.3429E−01 | 1.9491E−02 |
| A10 = | −4.2442E−01 | −1.9020E−02 | −5.9597E−02 | −8.8148E−03 |
| A12 = | 1.8468E−01 | 2.0591E−03 | 1.4956E−02 | 2.2571E−03 |
| A14 = | −3.8528E−02 | −1.2067E−03 | −2.1202E−03 | −3.5511E−04 |
| A16 = | −3.1857E−03 | 6.3612E−04 | 1.3415E−04 | 2.6712E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.73 | CT1/(CT2 + CT3) | 0.66 |
| Fno | 2.45 | |f/R6| | 0.71 |
| HFOV [deg.] | 35.5 | |f1/f2| | 0.33 |
| V2 | 23.8 | |f3/f2| | 0.54 |
| (V2 + V3)/V1 | 1.43 | Y32/CT3 | 4.32 |
| T23/T12 | 1.60 | | |

8th Embodiment

Figure 8A:
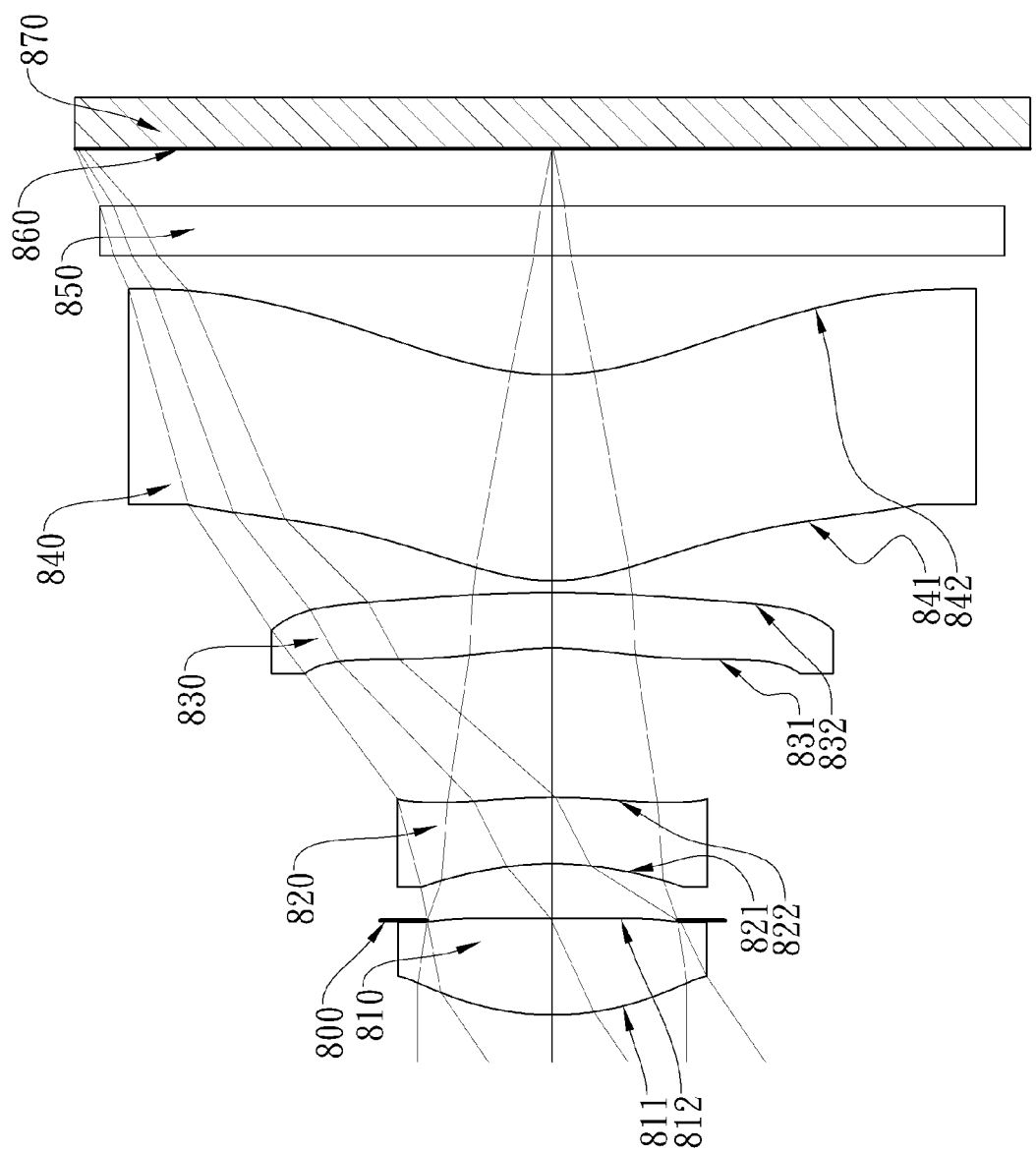
FIG. 8A is a schematic view of an imaging device according to the 8th embodiment of the present disclosure.
Figure 8B:
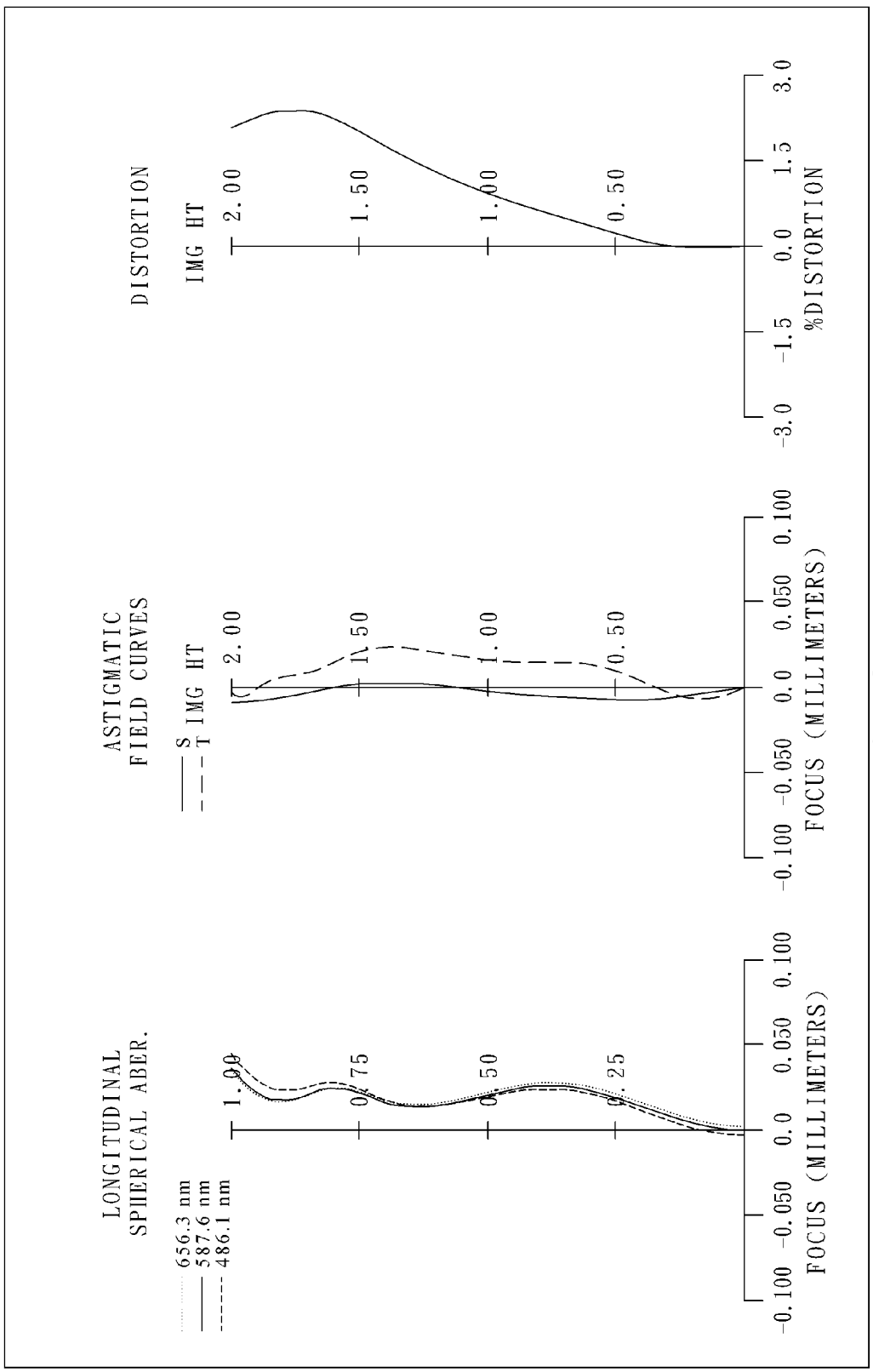
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging device according to the 8th embodiment.

In FIG. 8A, the imaging device includes the image capturing lens system (not otherwise herein labeled) of the present disclosure and an image sensor 870. The image capturing lens system includes, in order from an object side to an image side, a first lens element 810, an aperture stop 800, a second lens element 820, a third lens element 830, a fourth lens element 840, an IR-cut filter 850 and an image plane 860, wherein the image capturing lens system has a total of four lens elements (810-840) with refractive power.

The first lens element 810 with positive refractive power has an object-side surface 811 being convex in a paraxial region thereof and an image-side surface 812 being concave in a paraxial region thereof, which are both aspheric, and the first lens element 810 is made of plastic material.

The second lens element 820 with negative refractive power has an object-side surface 821 being concave in a paraxial region thereof and an image-side surface 822 being convex in a paraxial region thereof, which are both aspheric, and the second lens element 820 is made of plastic material. Furthermore, the image-side surface 822 of the second lens element 820 has at least one concave shape in an off-axis region thereof.

The third lens element 830 with negative refractive power has an object-side surface 831 being concave in a paraxial region thereof and an image-side surface 832 being convex in a paraxial region thereof, which are both aspheric, and the third lens element 830 is made of plastic material.

The fourth lens element 840 with positive refractive power has an object-side surface 841 being convex in a paraxial region thereof and an image-side surface 842 being concave in a paraxial region thereof, which are both aspheric, and the fourth lens element 840 is made of plastic material. Furthermore, the image-side surface 842 of the fourth lens element 840 has at least one convex shape in an off-axis region thereof.

The IR-cut filter 850 is made of glass and located between the fourth lens element 840 and the image plane 860, and will not affect the focal length of the image capturing lens system. The image sensor 870 is disposed on the image plane 860 of the image capturing lens system.

The detailed optical data of the 8th embodiment are shown in Table 15 and the aspheric surface data are shown in Table 16 below.

TABLE 15

8th Embodiment
f = 2.86 mm, Fno = 2.52, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.194 | ASP | 0.407 | Plastic | 1.544 | 55.9 | 2.22 |
| 2 | | 100.000 | ASP | −0.009 | | | | |
| 3 | Ape. Stop | Plano | | 0.239 | | | | |
| 4 | Lens 2 | −1.403 | ASP | 0.279 | Plastic | 1.634 | 23.8 | −5.17 |
| 5 | | −2.642 | ASP | 0.630 | | | | |
| 6 | Lens 3 | −1.272 | ASP | 0.234 | Plastic | 1.583 | 30.2 | −2.79 |
| 7 | | −6.187 | ASP | 0.050 | | | | |
| 8 | Lens 4 | 0.751 | ASP | 0.869 | Plastic | 1.544 | 55.9 | 2.20 |
| 9 | | 1.193 | ASP | 0.500 | | | | |
| 10 | IR-cut filter | Plano | | 0.210 | Glass | 1.517 | 64.2 | — |
| 11 | | Plano | | 0.242 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k = | −1.2085E+00 | 1.0000E+00 | −8.1160E+00 | −5.1158E+01 |
| A4 = | 6.4882E−02 | 2.4474E−02 | −4.5499E−02 | 2.0764E−01 |

TABLE 16-continued

| Aspheric Coefficients | | | | |
|---|---|---|---|---|
| A6 = | 3.3052E−02 | −2.3710E+00 | −2.3708E−02 | 6.2990E−02 |
| A8 = | −3.5867E−01 | 1.4707E+01 | −7.8064E−01 | 2.0278E−01 |
| A10 = | −2.2921E−01 | −4.9890E+01 | −3.2891E+00 | −2.8328E−01 |
| A12 = | 2.8520E−01 | 5.8625E+01 | 2.5096E+01 | −1.3547E−01 |
| A14 = | −1.6885E+00 | −1.0796E−01 | −4.1574E+01 | 1.0972E+00 |
| A16 = | −7.6881E+00 | 2.1930E−02 | 1.5163E−01 | 1.1130E−01 |

| Surface # | 6 | 7 | 8 | 9 |
|---|---|---|---|---|
| k = | −3.2927E+01 | −1.0000E+00 | −7.0885E+00 | −2.7855E+00 |
| A4 = | 3.3238E−01 | −7.3527E−02 | −1.1193E−02 | −1.2426E−01 |
| A6 = | −1.7401E−01 | 6.3345E−01 | −1.9421E−01 | 5.0701E−02 |
| A8 = | −1.2819E+00 | −1.8029E+00 | 2.6267E−01 | −1.0981E−02 |
| A10 = | 3.7130E+00 | 2.8120E+00 | −1.6766E−01 | 6.5719E−04 |
| A12 = | −4.7233E+00 | −2.4759E+00 | 5.9361E−02 | −7.5114E−06 |
| A14 = | 2.9299E+00 | 1.1265E+00 | −1.1091E−02 | 4.5039E−05 |
| A16 = | −7.3617E−01 | −2.0798E−01 | 8.5024E−04 | −6.5822E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.86 | CT1/(CT2 + CT3) | 0.79 |
| Fno | 2.52 | \|f/R6\| | 0.46 |
| HFOV [deg.] | 34.2 | \|f1/f2\| | 0.43 |
| V2 | 23.8 | \|f3/f2\| | 0.54 |
| (V2 + V3)/V1 | 0.97 | Y32/CT3 | 5.05 |
| T23/T12 | 2.74 | | |

9th Embodiment

Figure 9A:
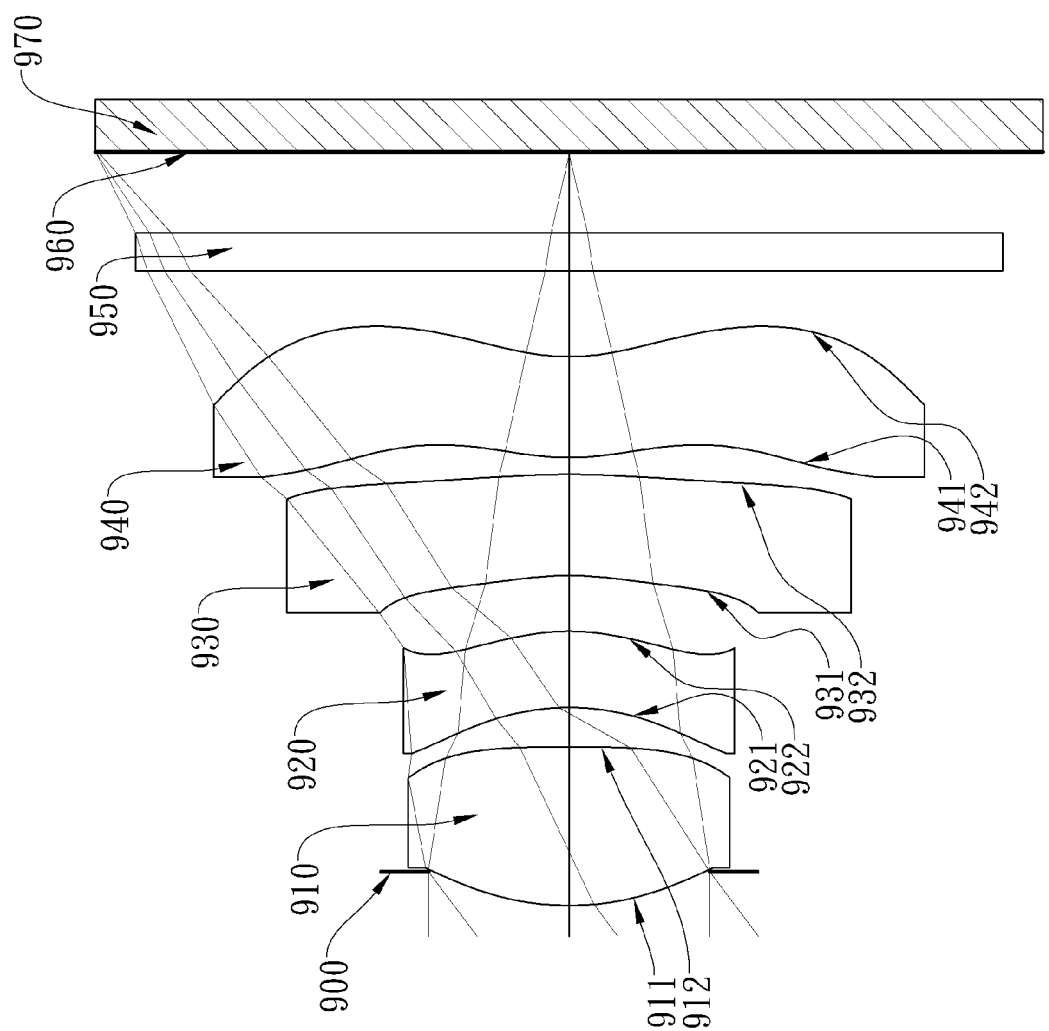
FIG. 9A is a schematic view of an imaging device according to the 9th embodiment of the present disclosure.
Figure 9B:
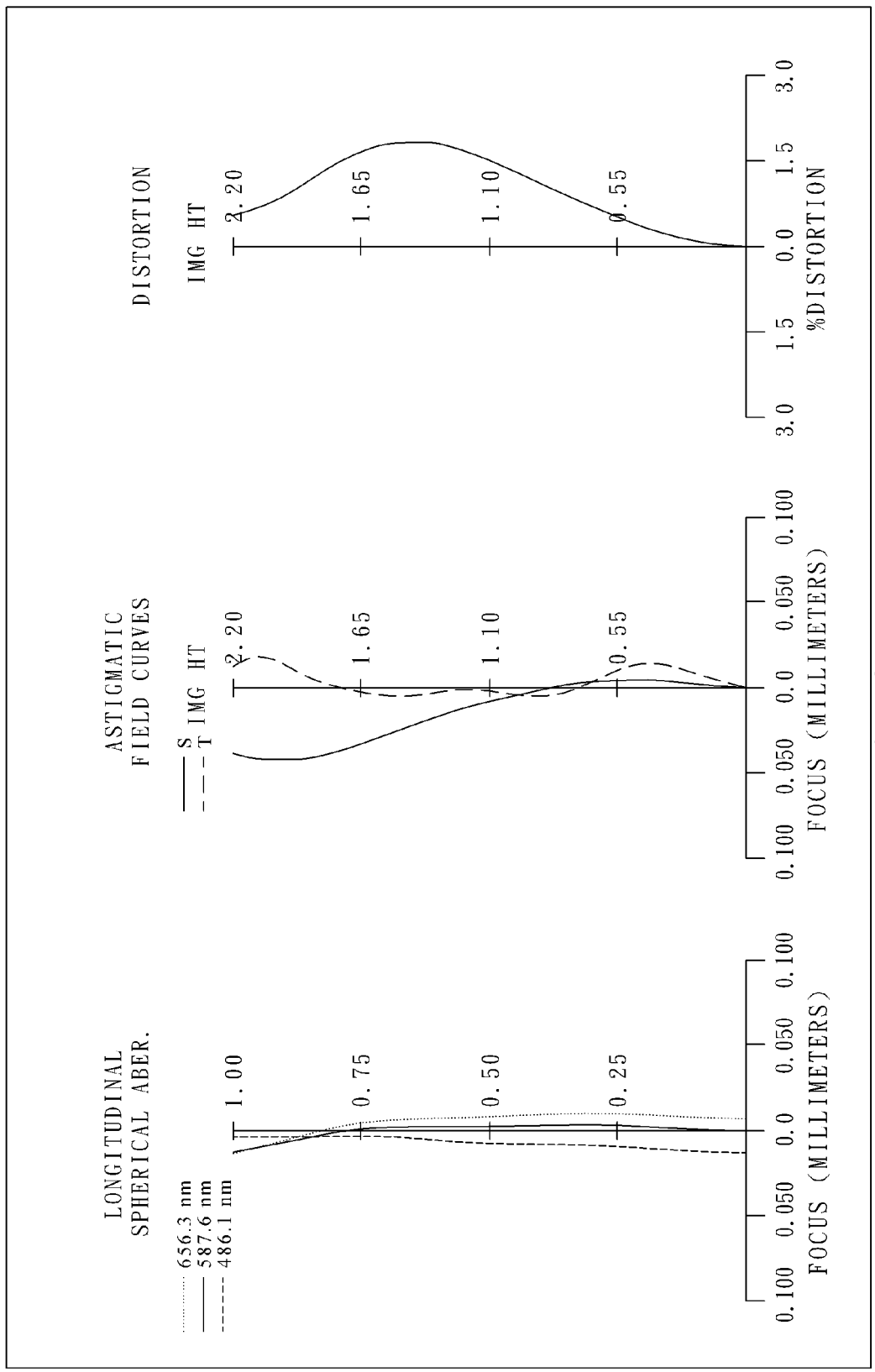
FIG. 9B shows spherical aberration curves, astigmatic field curves and a distortion curve of the imaging device according to the 9th embodiment.

FIG. 9A is a schematic view of an imaging device according to the 9th embodiment of the present disclosure. FIG. 9B shows, in order from left to right, spherical aberration curves, astigmatic field curves and a distortion curve of the imaging device according to the 9th embodiment.

In FIG. 9A, the imaging device includes the image capturing lens system (not otherwise herein labeled) of the present disclosure and an image sensor 970. The image capturing lens system includes, in order from an object side to an image side, an aperture stop 900, a first lens element 910, a second lens element 920, a third lens element 930, a fourth lens element 940, an IR-cut filter 950 and an image plane 960, wherein the image capturing lens system has a total of four lens elements (910-940) with refractive power.

The first lens element 910 with positive refractive power has an object-side surface 911 being convex in a paraxial region thereof and an image-side surface 912 being convex in a paraxial region thereof, which are both aspheric, and the first lens element 910 is made of glass material.

The second lens element 920 with positive refractive power has an object-side surface 921 being concave in a paraxial region thereof and an image-side surface 922 being convex in a paraxial region thereof, which are both aspheric, and the second lens element 920 is made of plastic material. Furthermore, the image-side surface 922 of the second lens element 920 has at least one concave shape in an off-axis region thereof.

The third lens element 930 with negative refractive power has an object-side surface 931 being concave in a paraxial region thereof and an image-side surface 932 being convex in a paraxial region thereof, which are both aspheric, and the third lens element 930 is made of plastic material.

The fourth lens element 940 with negative refractive power has an object-side surface 941 being convex in a paraxial region thereof and an image-side surface 942 being concave in a paraxial region thereof, which are both aspheric, and the fourth lens element 940 is made of plastic material. Furthermore, the image-side surface 942 of the fourth lens element 940 has at least one convex shape in an off-axis region thereof.

The IR-cut filter 950 is made of glass and located between the fourth lens element 940 and the image plane 960, and will not affect the focal length of the image capturing lens system. The image sensor 970 is disposed on the image plane 960 of the image capturing lens system.

The detailed optical data of the 9th embodiment are shown in Table 17 and the aspheric surface data are shown in Table 18 below.

TABLE 17

9th Embodiment
f = 2.90 mm, Fno = 2.22, HFOV = 37.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.157 | | | | |

TABLE 17-continued

9th Embodiment
f = 2.90 mm, Fno = 2.22, HFOV = 37.0 deg.

| Surface # | | Curvature Radius | | Thickness | Material | Index | Abbe # | Focal Length |
|---|---|---|---|---|---|---|---|---|
| 2 | Lens 1 | 1.249 | ASP | 0.737 | Glass | 1.542 | 62.9 | 2.10 |
| 3 | | −10.372 | ASP | 0.183 | | | | |
| 4 | Lens 2 | −1.120 | ASP | 0.354 | Plastic | 1.607 | 26.6 | 10.32 |
| 5 | | −1.064 | ASP | 0.259 | | | | |
| 6 | Lens 3 | −1.416 | ASP | 0.470 | Plastic | 1.633 | 23.4 | −3.65 |
| 7 | | −4.134 | ASP | 0.079 | | | | |
| 8 | Lens 4 | 1.191 | ASP | 0.468 | Plastic | 1.566 | 40.2 | −22.07 |
| 9 | | 0.933 | ASP | 0.400 | | | | |
| 10 | IR-cut filter | Plano | | 0.175 | Glass | 1.517 | 64.2 | — |
| 11 | | Plano | | 0.378 | | | | |
| 12 | Image | Plano | | — | | | | |

Note:
Reference wavelength is 587.6 nm (d-line).

TABLE 18

Aspheric Coefficients

| Surface # | 2 | 3 | 4 | 5 |
|---|---|---|---|---|
| k = | −1.2792E+00 | −9.0000E+01 | −2.2607E+00 | −3.6378E+00 |
| A4 = | 4.1974E−02 | −2.2200E−01 | −1.0609E−01 | 3.0666E−02 |
| A6 = | 7.8859E−02 | −6.3646E−01 | −6.4946E−01 | −5.6677E−01 |
| A8 = | −7.5859E−01 | 1.3498E+00 | 4.0460E+00 | 1.9635E+00 |
| A10 = | 1.5080E+00 | −4.0193E+00 | −8.3469E+00 | −6.1412E−01 |
| A12 = | −4.2982E−01 | 1.0580E+01 | 1.1468E+01 | −3.3424E+00 |
| A14 = | −3.9443E+00 | −1.3758E+01 | −1.0909E+01 | 5.2920E+00 |
| A16 = | 3.1711E+00 | 6.1682E+00 | 4.7340E+00 | −2.2820E+00 |

| Surface # | 6 | 7 | 8 | 9 |
|---|---|---|---|---|
| k = | −5.8827E+00 | −1.0000E+00 | −8.4802E+00 | −6.1255E+00 |
| A4 = | 9.5466E−01 | 1.8918E−01 | −5.9132E−01 | −3.1366E−01 |
| A6 = | −3.4163E+00 | −2.9602E−01 | 6.8142E−01 | 3.1046E−01 |
| A8 = | 7.8472E+00 | 4.0334E−01 | −6.2162E−01 | −2.5931E−01 |
| A10 = | −1.2275E+01 | −4.1264E−01 | 4.4141E−01 | 1.4629E−01 |
| A12 = | 1.1054E+01 | 2.5861E−01 | −1.9383E−01 | −5.2586E−02 |
| A14 = | −4.6976E+00 | −8.7240E−02 | 4.4729E−02 | 1.0500E−02 |
| A16 = | 3.1413E−01 | 1.1888E−02 | −4.1340E−03 | −8.5973E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.90 | CT1/(CT2 + CT3) | 0.89 |
| Fno | 2.22 | |f/R6| | 0.70 |
| HFOV [deg.] | 37.0 | |f1/f2| | 0.20 |
| V2 | 26.6 | |f3/f2| | 0.35 |
| (V2 + V3)/V1 | 0.80 | Y32/CT3 | 2.79 |
| T23/T12 | 1.42 | | |

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising, in order from an object side to an image side:
   a first lens element with positive refractive power having an object-side surface being convex in a paraxial region thereof;
   a second lens element with refractive power having an object-side surface being concave in a paraxial region thereof and an image-side surface being convex in a paraxial region thereof;
   a third lens element with negative refractive power having an object-side surface being concave in a paraxial region thereof; and
   a fourth lens element with refractive power having an image-side surface being concave in a paraxial region thereof, wherein both of an object-side surface and the image-side surface of the fourth lens element are aspheric, and the image-side surface of the fourth lens element has at least one convex shape in an off-axis region thereof;

wherein the image capturing lens system has a total of four lens elements with refractive power, any two lens elements of the image capturing lens system adjacent to each other have a space in a paraxial region between the two lens elements, a focal length of the second lens element is f2, a focal length of the third lens element is f3, an axial distance between the second lens element and the third lens element is T23, an axial distance between the first lens element and the second lens element is T12, and the following conditions are satisfied:

$|f3/f2|<0.60$; and $1.0<T23/T12<3.6$.

2. The image capturing lens system of claim 1, wherein an Abbe number of the second lens element is V2, an Abbe number of the third lens element is V3, an Abbe number of the first lens element is V1, and the following condition is satisfied:

$0.60<(V2+V3)/V1<1.20$.

3. The image capturing lens system of claim 1, wherein a focal length of the image capturing lens system is f, a curvature radius of the image-side surface of the third lens element is R6, and the following condition is satisfied:

$|f/R6|<1.0$.

4. The image capturing lens system of claim 1, wherein the image-side surface of the second lens element has at least one concave shape in an off-axis region thereof.

5. The image capturing lens system of claim 1, wherein the image-side surface of the third lens element has at least one convex shape in an off-axis region thereof.

6. The image capturing lens system of claim 1, wherein a vertical distance between a maximum effective diameter position on the image-side surface of the third lens element and an optical axis is Y32, a central thickness of the third lens element is CT3, and the following condition is satisfied:

$3.0<Y32/CT3<6.0$.

7. An imaging device, comprising:
the image capturing lens system of claim 1; and
an image sensor.

8. A mobile terminal, comprising:
the imaging device of claim 7.

9. The image capturing lens system of claim 1, wherein the object-side surface of the fourth lens element is convex in a paraxial region thereof.

10. The image capturing lens system of claim 9, wherein the axial distance between the first lens element and the second lens element is T12, the axial distance between the second lens element and the third lens element is T23, and the following condition is satisfied:

$1.0<T23/T12<2.8$.

11. The image capturing lens system of claim 9, wherein the focal length of the second lens element is f2, the focal length of the third lens element is f3, and the following condition is satisfied:

$|f3/f2|<0.45$.

12. The image capturing lens system of claim 9, wherein a focal length of the first lens element is f1, the focal length of the second lens element is f2, and the following condition is satisfied:

$|f1/f2|<0.50$.

13. The image capturing lens system of claim 9, further comprising:
a stop, wherein the stop is disposed between an imaged object and the first lens element.

14. The image capturing lens system of claim 9, wherein an Abbe number of the second lens element is V2, and the following condition is satisfied:

$V2<30$.

15. The image capturing lens system of claim 14, wherein the fourth lens element has positive refractive power.

16. An image capturing lens system comprising, in order from an object side to an image side:
a first lens element with positive refractive power having an object-side surface being convex in a paraxial region thereof;
a second lens element with refractive power having an object-side surface being concave in a paraxial region thereof and an image-side surface being convex in a paraxial region thereof;
a third lens element with negative refractive power having an object-side surface being concave in a paraxial region thereof; and
a fourth lens element with refractive power having an image-side surface being concave in a paraxial region thereof, wherein both of an object-side surface and the image-side surface of the fourth lens element are aspheric, and the image-side surface of the fourth lens element has at least one convex shape in an off-axis region thereof;

wherein the image capturing lens system has a total of four lens elements with refractive power, any two lens elements of the image capturing lens system adjacent to each other have a space in a paraxial region between the two lens elements, a focal length of the second lens element is f2, a focal length of the third lens element is f3, an axial distance between the second lens element and the third lens element is T23, an axial distance between the first lens element and the second lens element is T12, a central thickness of the first lens element is CT1, a central thickness of the second lens element is CT2, a central thickness of the third lens element is CT3, and the following conditions are satisfied:

$|f3/f2|<1.25$;

$0.6<T23/T12<3.6$; and $0.60<CT1/(CT2+CT3)$.

17. The image capturing lens system of claim 16, wherein the image-side surface of the second lens element has at least one concave shape in an off-axis region thereof.

18. The image capturing lens system of claim 16, wherein an Abbe number of the second lens element is V2, and the following condition is satisfied:

$V2<30$.

19. The image capturing lens system of claim 16, wherein the central thickness of the first lens element is CT1, the central thickness of the second lens element is CT2, the central thickness of the third lens element is CT3, and the following condition is satisfied:

$$0.75 < CT1/(CT2+CT3) < 1.5.$$

20. The image capturing lens system of claim 16, wherein a focal length of the image capturing lens system is f, a curvature radius of the image-side surface of the third lens element is R6, and the following condition is satisfied:

$$|f/R6| < 1.0.$$

21. The image capturing lens system of claim 16, wherein the focal length of the second lens element is f2, the focal length of the third lens element is f3, and the following condition is satisfied:

$$|f3/f2| < 0.90.$$

22. The image capturing lens system of claim 16, wherein a focal length of the first lens element is f1, the focal length of the second lens element is f2, and the following condition is satisfied:

$$|f1/f2| < 0.50.$$

23. The image capturing lens system of claim 16, wherein the object-side surface of the fourth lens element is convex in a paraxial region thereof, and the fourth lens element has positive refractive power.

24. The image capturing lens system of claim 16, wherein a vertical distance between a maximum effective diameter position on the image-side surface of the third lens element and an optical axis is Y32, the central thickness of the third lens element is CT3, and the following condition is satisfied:

$$3.0 < Y32/CT3 < 6.0.$$

25. The image capturing lens system of claim 16, wherein an Abbe number of the second lens element is V2, an Abbe number of the third lens element is V3, an Abbe number of the first lens element is V1, and the following condition is satisfied:

$$0.60 < (V2+V3)/V1 < 1.20.$$

* * * * *